(12) United States Patent
Lyonnet et al.

(10) Patent No.: US 11,682,074 B2
(45) Date of Patent: Jun. 20, 2023

(54) DECISION-MAKING SYSTEM AND METHOD BASED ON SUPERVISED LEARNING

(71) Applicant: GDS Link, LLC, Dallas, TX (US)

(72) Inventors: Florian Lyonnet, Dallas, TX (US); Estela Alvarez Navas, Madrid (ES)

(73) Assignee: GDS Link LLC, Dallas, TX (US)

( * ) Notice: Subject to any disclaimer, the term of this patent is extended or adjusted under 35 U.S.C. 154(b) by 305 days.

(21) Appl. No.: 15/953,029

(22) Filed: Apr. 13, 2018

(65) Prior Publication Data
US 2019/0318421 A1 Oct. 17, 2019

(51) Int. Cl.
*G06Q 40/00* (2023.01)
*G06N 20/00* (2019.01)
*G06Q 40/03* (2023.01)

(52) U.S. Cl.
CPC .............. *G06Q 40/03* (2023.01); *G06N 20/00* (2019.01)

(58) Field of Classification Search
CPC .............................. G06Q 40/025; G06Q 40/03
See application file for complete search history.

(56) References Cited

U.S. PATENT DOCUMENTS

| | | | | |
|---|---|---|---|---|
| 2011/0173116 | A1* | 7/2011 | Yan | G06Q 10/067 705/38 |
| 2014/0006106 | A1* | 1/2014 | Malov | G06Q 30/0204 |
| 2014/0214648 | A1 | 7/2014 | Merrill et al. | |
| 2016/0155193 | A1 | 6/2016 | Merrill et al. | |
| 2017/0213280 | A1* | 7/2017 | Kaznady | G06Q 40/025 |
| 2018/0032870 | A1* | 2/2018 | Liu | G06Q 40/06 |
| 2018/0129325 | A1* | 5/2018 | Shreve | G06F 3/048 |
| 2018/0204281 | A1* | 7/2018 | Painter | G06Q 20/102 |
| 2018/0285780 | A1* | 10/2018 | Ouyang | G06N 99/00 |

FOREIGN PATENT DOCUMENTS

WO    WO 2016/160539 A1    10/2016

OTHER PUBLICATIONS

Kim, at al, in A hybrid decision tree algorithm for mixed numeric and categorical data in regression analysis, from Pattern Recognition Letters, vol. 98, 2017 (Year: 2017).*

* cited by examiner

*Primary Examiner* — Mike Anderson
*Assistant Examiner* — Brandon M Duck
(74) *Attorney, Agent, or Firm* — The Danamraj Law Group, P.C

(57) ABSTRACT

System, apparatus, user equipment, and associated computer program and computing methods are provided for facilitating efficient decision-making with respect to a subject entity. In one aspect, a labeled training dataset containing N records respectively corresponding to N entities is provided for training a decision engine based on performing supervised learning. Responsive to receiving a plurality of attribute values for the subject entity requiring a decision relative to an estimate of a performance variable based on at least a portion of the attribute values, the trained decision engine is configured to determine a decision score as a function obtained as a set of linearly decomposed constituent components corresponding to the attribute values of the subject entity, thereby effectuating an objective determination of which attributes contribute to what portions of the decision score in a computationally efficient manner.

20 Claims, 15 Drawing Sheets

| ATTRIBUTE VARIABLES / APPLICANT ENTITY | A(1) AGE 304-1 | A(2) GENDER 304-2 | A(3) MARITAL STATUS 304-3 | A(4) SELF-EMPLOYED? YEARS 304-4 | A(5) CURRENT JOB DURATION 304-5 | A(6) INCOME 304-6 | ... | A(P) 304-P | OBSERVED PERFORMANCE VARIABLE OR PARAMETER 306 |
|---|---|---|---|---|---|---|---|---|---|
| X(1) 302-1 | | | | | | | ⋮ | | GOOD (E.G., NO DEFAULT) |
| X(2) 302-2 | | | | | | | ⋮ | | BAD (E.G., DEFAULTED AT LEAST ONCE) |
| X(3) 302-3 | | | | | | | ⋮ | | GOOD |
| ...... | | | | | | | ⋮ | | ...... |
| X(N) 302-N | | | | | | | ⋮ | | |

DECISION-MAKING SYSTEM AND METHOD BASED ON SUPERVISED LEARNING

FIELD OF THE DISCLOSURE

The present disclosure generally relates to artificial intelligence and machine learning. More particularly, and not by way of any limitation, the present disclosure is directed to effectuating a decision-making system and method based on supervised learning.

BACKGROUND

A credit score is a numerical expression based on a level analysis of an entity's credit files, to represent the credit worthiness of an individual or an organization. A credit score is primarily based on a credit report information typically sourced from third-party entities such as credit bureaus. Lenders, such as banks, credit unions, credit card companies, and other financial institutions, etc. use credit scores to evaluate the potential risk posed by lending money to consumers and to mitigate losses due to bad debt. Such entities typically use credit scores to determine who qualifies for a loan as well as at what interest rates and/or what credit limits. Lenders may also use credit scores to determine which customers are likely to bring in the most revenue.

Credit scoring is not limited to financial institutions. Other organizations, such as mobile phone companies, insurance companies, landlords, and government departments may also employ similar techniques in different transactional contexts. Further, digital finance companies such as online lenders also use alternative data sources to calculate the creditworthiness of borrowers.

Although credit scoring aims to rank a borrower's credit riskiness, which may be useful in certain transactional scenarios, several limitations do remain. Typically, as an ordinal ranking, some scores only provide a borrower's riskiness from highest to lowest. Another limitation to credit scoring is its inability to explicitly factor in specific attributes of a subject borrower's profile.

Statistical models have been used in order to ascertain credit worthiness of applicants. Using machine learning algorithms to build such models has so far been hindered by the fact that generating suitable reports that comply with applicable laws and regulations is a complex task.

Accordingly, it should be appreciated that although several advances have been made in credit scoring and reporting, there is still room for further improvement as will be detailed below.

SUMMARY

The present patent disclosure is broadly directed to a system, apparatus, and associated computer program and computing methods for facilitating efficient decision-making with respect to a subject entity requiring an evaluation or assessment relative to a suitable performance variable, e.g., credit worthiness, risk of default, etc. In one aspect, a labeled training dataset containing N records respectively corresponding to N entities is provided for training a decision engine based on performing supervised learning. Responsive to receiving a plurality of attribute values for the subject entity requiring a decision relative to an estimate of the performance variable, the trained decision engine is configured to determine a decision score as a function obtained as a set of linearly decomposed constituent components corresponding to the attribute values of the subject entity, thereby effectuating an objective determination of which attributes contribute to what portions of the decision score in a computationally efficient manner.

In another aspect, an example embodiment of a method may further comprise, inter alia, applying a set of regulatory compliance rules against the set of linearly decomposed constituent components contributing to the decision score; determining an action report based on selecting at least a subset of the linearly decomposed constituent components, wherein the attribute variables of the subject entity corresponding to the selected subset of the linearly decomposed constituent components are compliant with respect to the regulatory compliance rules; and transmitting the action report to at least one of the subject entity, a governmental agency, a financial institution, and a third-party entity.

In one embodiment, an example trained decision engine may comprise a Random Forest (RF) ensemble of a plurality of decision trees, e.g., classification trees, wherein a decision score may be obtained as a function of an aggregate probability value that is linearly decomposable to constituent probabilities. In another embodiment, an example trained decision engine may comprise a Gradient Boosted Tree (GBT) ensemble of a plurality of decision trees comprising regression trees, wherein a decision score may be obtained as a function of a sum of scores that is linearly decomposable to differential values of scores corresponding to different attributes. In still further aspects, one or more embodiments of a non-transitory computer-readable medium containing computer-executable program instructions or code portions stored thereon are disclosed for performing one or more embodiments of the methods set forth herein when executed by one or more processors of a network node, element, computer-implemented apparatus, and the like.

In some example implementations, a decision score may be roughly equivalent, without limitation, to a credit risk score depending on the context of where an embodiment of the present invention is practiced.

Further features of the various embodiments are as claimed in the dependent claims. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIG. 3 depicts an example labeled training database for purposes of an embodiment of the present invention;

DETAILED DESCRIPTION OF THE DRAWINGS

Figure 1:
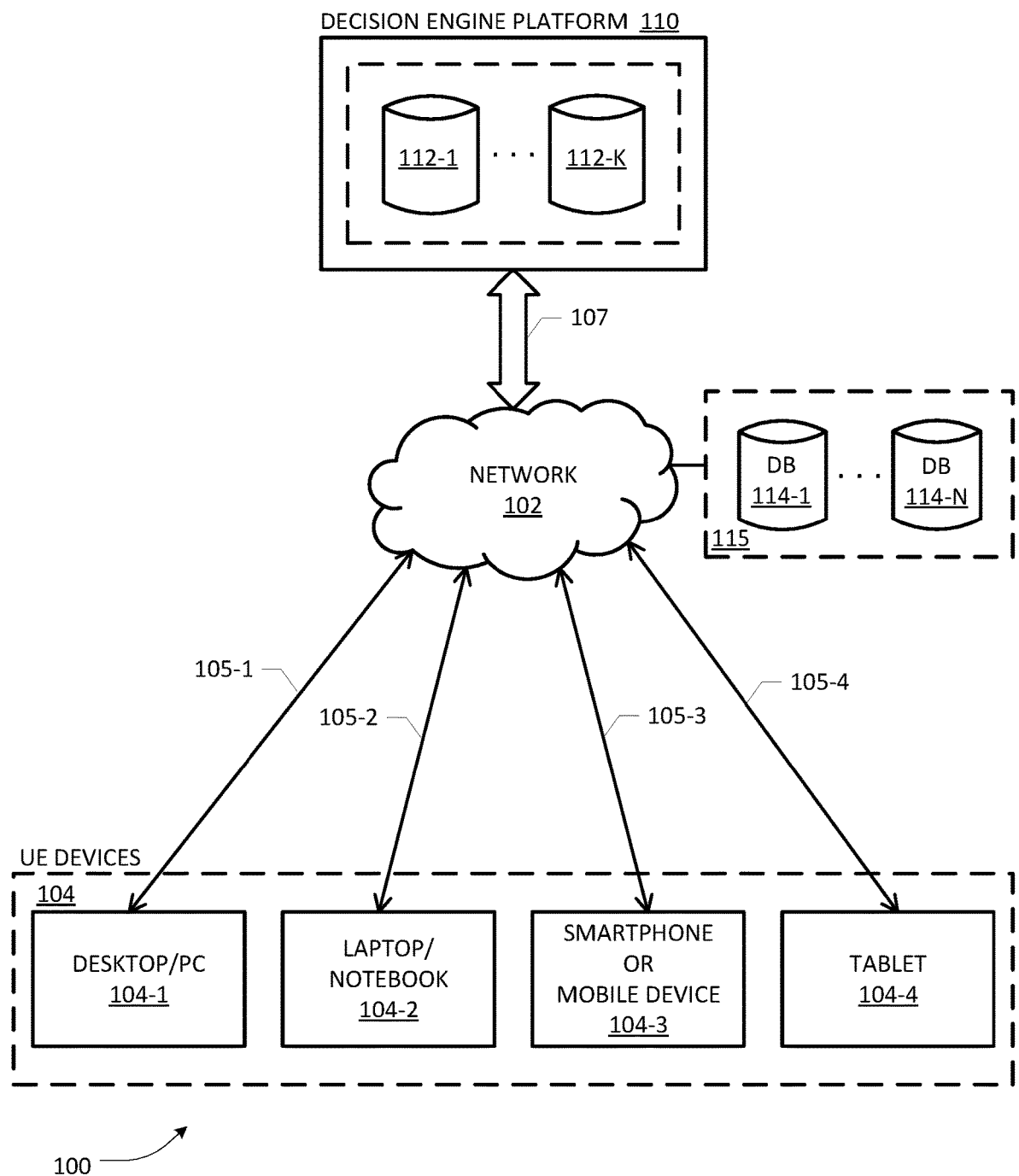
FIG. 1 depicts an example network architecture wherein one or more embodiments of the present invention may be practiced for facilitating efficient decision making with respect to a subject entity in accordance with the teachings of the present patent disclosure.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices, modules, or nodes (e.g., a subject client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating various types of communications.

Referring now to the drawings and more particularly to FIG. 1, depicted therein is an example network architecture 100 wherein one or more embodiments of the present invention may be practiced for facilitating efficient decision making with respect to a subject entity in accordance with the teachings of the present patent disclosure. Skilled artisans will recognize that the network architecture 100 is illustrative of a distributed computing environment involving a wide area packet-switched network 102 (e.g., at least a portion of the Internet, a service provider network, an enterprise intranet, or a combination thereof) wherein subject entities using one or more subject entity devices or equipment are operative to input various types of data for purposes of obtaining an evaluation, assessment or decision with respect to qualifying for or obtaining various types of products and/or services including but not limited to financial products or services such as home/auto loans, educational loans, bank loans, mortgages, insurance products, equipment loans, home/auto leases, and the like, that may involve credit worthiness based on risk of default. For purposes of the present invention, subject entities may be individuals, organizations or business entities, etc., for which/whom specific types of data may be collected, gathered or otherwise established, referred to as features or attribute variables, that may be used as predictors in a decision-making process for scoring, evaluating or assessing a performance variable relating to risk or default. As used herein, a predictor or attribute variable may be any variable predictive of risk of default associated with a subject entity, and as such may comprise in an example embodiment variables indicative of one or more demographic and/or socio-economic characteristics or profiles (e.g., age, race, income level, gender, educational level, location, ethnicity, marital status, employment status/history, and family size, etc.) as well as financial history variables (e.g., variables indicative of prior actions or transactions involving an entity, for which information can be obtained from credit files or records, financial records, consumer records, or other banking data), criminal records, medical history variables indicative of behavioral traits and health conditions, and variables based on social media network profiles of the entity, and so on.

Illustratively, a plurality of user equipment (UE) devices 104 may be configured to operate as subject entity equipment or devices, e.g., desktop/personal computers 104-1, laptop/notebooks 104-2, smartphones or mobile communications devices 104-3, tablets/phablets 104-4, etc., that can communicate with the network 102 using wired and/or wireless access networks or links 105-1 to 105-4, whereby a subject entity may engage suitable software and input hardware (e.g., a browser, an app, etc.) to interface with an institution, organization, or entity that requires subject entity data, e.g., as a credit application, for scoring, evaluation and assessment. In one arrangement, such an institution or entity may comprise a financial institution, a bank, a mortgage company, a lending institution, a credit union, etc. that directly evaluates the subject entity's application based on a decision making process based on supervised learning as will be set forth in detail hereinbelow. In another arrangement, a third-party entity may be configured to receive the subject entity's data and execute a decision making process on behalf of a financial entity, a credit reporting entity, a governmental entity, etc. Regardless of which party or entity acquires the subject entity data and/or where the decision making process takes place, example network architecture 100 of the present invention provides a server platform, node, system or apparatus 110 coupled to the network 102 via bi-directional pathway(s) 107 in a variety of configurations, e.g., as part of an institution's intranet infrastructure, an extranet-based infrastructure, a cloud-based platform, e.g., Software as a Service (SaaS), Platform as a Service (PaaS), Infrastructure as a Service (IaaS), etc., with multiple constituent components providing different aspects of an example embodiment of the present invention, as will be described in additional detail below. Skilled artisans will also appreciate that an example cloud-computing environment may comprise one or more of private clouds, public clouds, hybrid clouds, community clouds, distributed clouds, multiclouds and interclouds (e.g., "cloud of clouds"), and the like.

In accordance with the teachings of the present invention, server platform 110 may be configured with the appropriate program instructions and logic to effectuate supervised learning over a set of labeled training samples containing a plurality of records, each corresponding to an entity for which suitable attribute data has been gathered and a performance variable of relevance (e.g., a credit score, a decision as to whether the entity's credit application has been rejected or accepted, or whether the entity has defaulted or not once accepted, etc.) has been recorded. Databases 112-1 to 112-K may represent or contain such labeled training sample data for different lending institutions, third-party organizations, different classes of financial products, and/or different populations or categories of subject entities, at least a portion of which may be provided as a multi-factorial or multivariate input (i.e., an input vector space) for generating a trained decision engine that is operative to provide a decision score in a computationally efficient manner for a candidate subject entity (also referred to as a credit applicant) in an embodiment of the present invention.

In a further variation, a Big Data analytics platform 115 containing vast amounts of various pieces of data, at least some of which may have relevance to or otherwise operate to provide at least portions of attribute data with respect to one or more labeled training datasets pertaining to a large number of subject entities for purposes of decision score determination. In the context of the present patent application, "Big Data" may be used as a term for a collection of data sets so large and complex that it becomes virtually impossible to process using conventional database management tools or traditional data processing applications. Challenges involving Big Data may include capture, curation, storage, search, sharing, transfer, analysis, and visualization, etc. Because Big Data from which relevant attribute variables may be extracted with respect to subject entities can be on the order of several terabytes to petabytes to exabytes, e.g., relating to medical histories, third-party financial/credit histories, social media profiles, etc. it becomes exceedingly difficult to work with using most relational database management systems for optimizing, ranking and indexing suitable attributes in typical environments. Accordingly, suitable Big Data analytical techniques operating on databases 114-1 to 114-N may be employed in conjunction with the server platform 110 in one example implementation.

Figure 2:
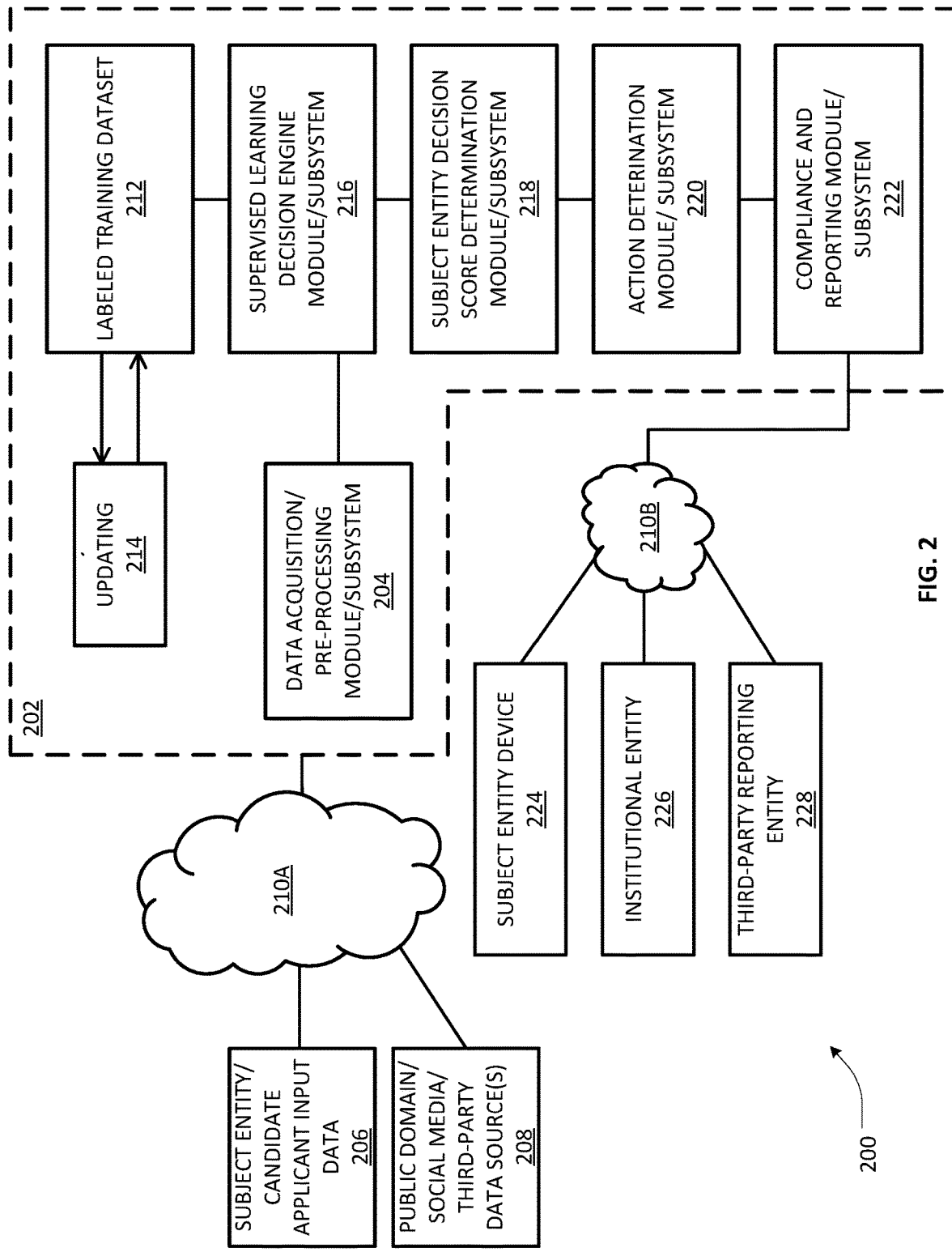
FIG. 2 depicts an example system according to an embodiment of the present patent application.

An example system 200 depicted in FIG. 2 is representative of at least a portion of the network architecture 100 of FIG. 1 that illustrates additional details of a decision engine server platform 202 according to an embodiment of the present patent application. A data acquisition/pre-processing module or subsystem 204 is operative to interface with a suitable networking infrastructure 210A for receiving a subject entity or candidate's attribute data 206. As noted previously, such data may be acquired from the subject entity operating a suitable subject entity device or from a third-party entity forwarding such data to obtain a decision with respect to the subject entity. The data acquisition/pre-processing module or subsystem 204 may also interface with one or more public domain data sources 208 including social media sources, credit bureaus, etc., for obtaining relevant data with respect to the subject entity. In one arrangement, various types of data pre-processing operations may be effectuated with respect to the myriad pieces of raw data collected for/from the subject entity, e.g., sub-sampling, data coding/transformation, data conversion, scaling or normalization, and the like, prior to forming an appropriate attribute variable dataset that is provided as an input to a trained decision engine module or subsystem 216. In accordance with the teachings of the present invention, the decision engine module 216 may be generated and/or configured responsive to performing supervised learning on a labeled training dataset 212 that may be periodically updated or revised depending upon validation/cross-validation input 214 with respect to the predictive performance of the decision engine module 216. Broadly, supervised learning comprises a type of machine leaning that involves generating a predictive model or engine based on decision trees built from a training sample to go from observations about a plurality of features or attributes and separating the members of the training sample in an optimal manner according to one or more predefined indicators. Tree models where a target variable can take a discrete set of values are referred to as classification trees, with terminal nodes or leaves representing class labels and nodal branches representing conjunctions of features that lead to the class labels. Decision trees where the target variable can take on continuous values are referred to as regression trees. In an embodiment of the present invention, a typical target variable is a dependent variable (e.g., a performance variable such as occurrence/absence of default) that exhibits a multi-factorial functional relationship with respect to the training sample population's attributes or features. Further, an embodiment of the present invention may advantageously employ supervised learning that involves ensemble techniques where more than one decision tree (typically, a large set of decision trees) are constructed. In one variation, a boosted tree technique may be employed by incrementally building an ensemble by training each tree instance to emphasize the training instances previously mis-modeled or mis-classified. In another variation, bootstrap aggregated (i.e., "bagged") tree technique may be employed that builds multiple decision trees by repeatedly resampling training data with or without replacement of a randomly selected feature or attribute operating as a predictive classifier.

Accordingly, in one embodiment of the present invention, the trained decision engine module 216 may comprise a Gradient Boosted Tree (GBT) ensemble of a plurality of regression trees. In another embodiment, the trained decision engine module 216 may comprise a Random Forest (RF) ensemble of a plurality of classification trees. Skilled artisans will recognize upon reference hereto that decision trees based on supervised learning in the context of present patent application can be either classification trees or regression trees, and a decision engine obtained based on an ensemble of such trees may be advantageously used in an example embodiment of the present invention. Regardless of which decision engine module is used, a decision score determination module or subsystem 218 is configured to generate a decision score, or equivalently a risk score, based on a predicted value of the selected performance variable provided by the decision engine module 216. As will be set forth in additional detail further below, an embodiment of the present invention is advantageously configured to determine a decision score for the subject entity as a function of an average of aggregate probability value (e.g., relating to a risk of default), which decision score or the aggregate probability value may be obtained in terms of a set of linearly decomposed constituent components (i.e., probabilities or score components) corresponding to the subject entity's attributes/features over an ensemble of decision trees. Skilled artisans will appreciate that such a scheme advantageously facilitates an action determination module or subsystem 220 to obtain objective and highly accurate determination of which attributes contribute to what portions of the decision score in a computationally efficient manner.

By way of illustration, a compliance and reporting module or subsystem 222 may be configured to interface with the action determination module 220 for applying one or more regulatory compliance rules or regulations established by appropriate governmental agencies (domestic or international) against the set of linearly decomposed constituent components contributing to a particular subject entity's the decision score. A unique and advantageous aspect of an embodiment of the present invention is that the overall probability function relative to the applicable performance variable may be determined as a decomposition of additive terms that uniquely correspond to a dimension of the feature vector (i.e., a predictor attribute) of an N-dimensional input space. Consequently, the action determination module 220 may be configured to determine uniquely and easily which one(s) of the predictor attributes contribute the most to the increase of the overall probability function for the subject entity or credit applicant with respect to defaulting. In some arrangements, based on the probability of default—and potentially along with some other considerations—the subject entity's credit application may be rejected. Regardless of whether a subject entity is ultimately rejected or not, a compliant adverse action report or letter may be generated quickly, efficiently and automatically by applying a suitable compliance rules engine based on at least a subset of the linearly decomposed constituent components e.g., probabilities or score differentials, that correspond to the predictor features selected to be within the bounds of applicable compliance rules. For instance, two US federal laws—the Equal Credit Opportunity Act (ECOA), as implemented by Regulation B, and the Fair Credit Reporting Act (FCRA)—reflect a legislative determination that consumers and businesses applying for credit should receive notice of the reasons a creditor took adverse action on the application or on an existing credit account. Notice is also required under the FCRA for adverse actions taken with respect to insurance transactions, employment decisions, and in certain other circumstances. Whereas adverse action notices under the ECOA and Regulation B are designed to help consumers and businesses by providing transparency to the credit underwriting process and protecting against potential credit discrimination by requiring creditors to explain the reasons adverse action was taken, the FCRA's requirements for adverse action notices apply only to consumer transactions and are designed to alert consumers that negative information was the basis for the adverse action. Under the FCRA, the consumer has 60 days from the date of the notice to obtain more details about the negative information so that if it is erroneous, the consumer can correct it. To reduce the compliance burden, a creditor can use a single, combined notice to comply with the adverse action requirements of both laws. Accordingly, the compliance and reporting module 222 of the example system 200 can advantageously and efficiently select permissible sets of attributes and generate a customized action letter or report, which in some implementations may comprise or be compatible with model forms published in connection with the applicable regulations.

For purposes of the present patent application, an adverse action under one regulatory scheme (e.g., ECOA) may be defined as: (i) a refusal to grant credit in substantially the amount or on substantially the terms requested in an application unless the creditor makes a counteroffer (to grant credit in a different amount or on other terms), and the subject applicant uses or expressly accepts the credit offered; (ii) a termination of an account or an unfavorable change in the terms of an account that does not affect all or substantially all of a class of the creditor's accounts; or (iii) refusal to increase the amount of credit available to an applicant who has made an application for an increase. In another regulatory scheme (e.g., FCRA), an adverse action may be defined as: (i) adverse action as defined in ECOA; (ii) a denial or cancellation of, an increase in any charge for, or a reduction or other adverse or unfavorable change in the terms of coverage or amount of, any insurance, existing or applied for, in connection with the underwriting of insurance; (iii) a denial of employment or any other decision for employment purposes that adversely affects any current or prospective employee; (iv) a denial or cancellation of, an increase in any charge for, or any adverse or unfavorable change in the terms of a government license or benefit; or (v) an action on an application or transaction initiated by a consumer, or in connection with account review that is adverse to the consumer's interests. Thus, skilled artisans will appreciate that although what constitutes an adverse action under different regulatory schemes may be different, embodiments of the present invention can provide a computationally efficient mechanism to generate accurate and compliant reports relatively quickly that are customizable not only to different creditors, lenders, other institutions, as well as different classes of subject entities, etc., but also applicable in different markets, industries, businesses, and the like.

The compliance and reporting module 222 may also configured with appropriate notice requirements, e.g., time, place, and manner conditions, such that customized action reports may be timely generated and transmitted automatically and/or otherwise, to relevant parties, e.g., subject entity at a select device 224 of choice, institutional entities 226, and/or third-party credit bureau entities 228, and the like, via suitable communications network infrastructure 2106.

FIG. 3 depicts an illustrative example of a labeled training database 300 for purposes of an embodiment of the present invention. A plurality (N) of records respectively corresponding to a sampling population of N applicants/entities X(1) 302-1 to X(N) 302-N are provided wherein each record comprises a value relating to a target/performance variable 306 and a plurality of values corresponding to a set of predictor attribute variables {A(i)} 304-1 to 304-P. In the example database 300, the performance variable 306 may comprise observations for the N entities made with respect to their respective credit performance, e.g., whether the entity defaulted or not, etc. As illustrated, age A(1) 304-1, gender A(2) 304-2, marital status A(3) 304-3, employment status A(4) 304-4, current job duration A(5) 304-5, income A(6) 304-6, etc., are shown as part of a P-dimensional predictor feature vector that may be provided as input to a supervised learning module for generating a trained (or, roughly synonymously "fitted") decision engine as set forth in the present patent application. It will be apparent to skilled artisans that the performance variables and/or attribute variables may comprise qualitative and/or quantitative data, which may in turn include discrete data, continuous data, ordinal data, categorical data, numerical data, classificatory data, binary data, etc., or any combination thereof. As noted previously, the sampling population of the training database 300 may be periodically updated, e.g., in terms of selecting different populations, different attributes, or both, over a period of time, which may be based on the need for retraining a particular decision engine (e.g., responsive to validation/cross-validation against known validation samples).

Figure 4A:
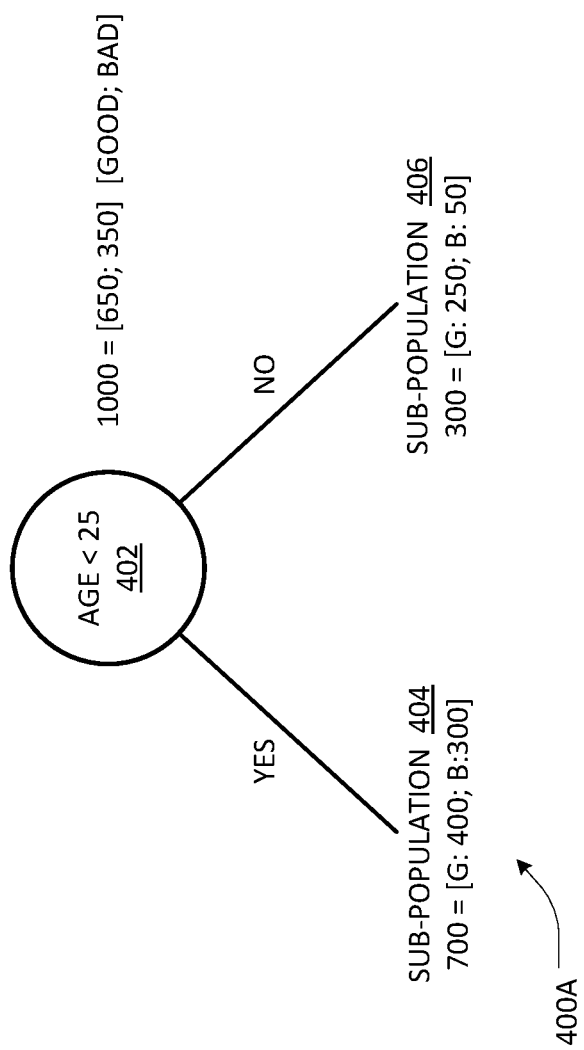
FIGS. 4A and 4B depict an illustrative example scheme for generating a classification decision tree that may be generalized for producing a trained decision engine comprising a Random Forest (RF) ensemble of decision trees for purposes of an embodiment of the present invention.
Figure 4B:
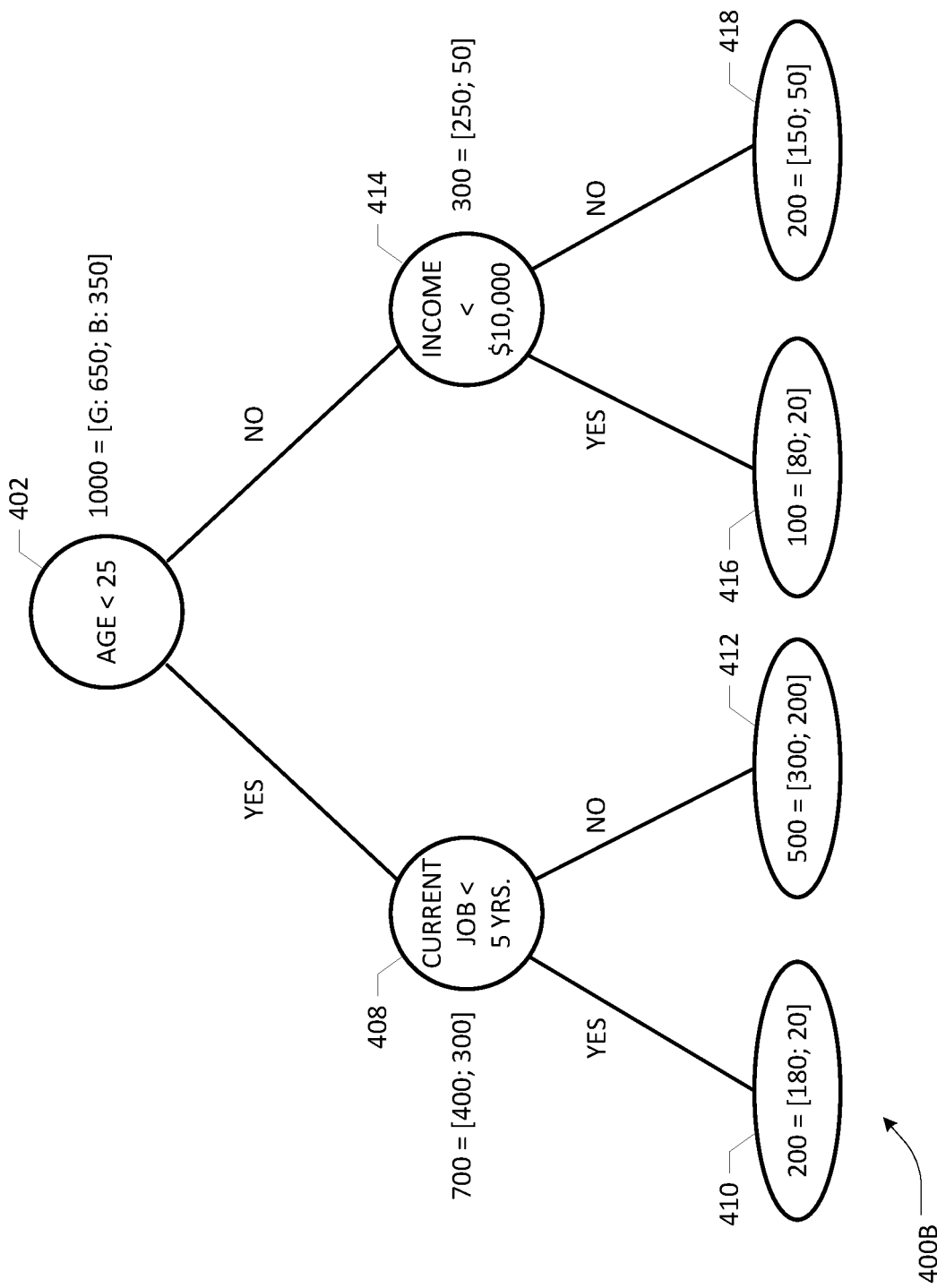

Turning to FIGS. 4A and 4B, depicted therein is an illustrative example scheme for generating a single classification decision tree that may be generalized for producing a trained decision engine comprising a Random Forest (RF) ensemble of decision trees for purposes of an embodiment of the present invention. Broadly, an embodiment of an ensemble process may involve randomly selecting a subsample (e.g., K features) from a total of P features of an input vector. Typically, K may selected to be substantially smaller than M (K<<M) in order to minimize what is known as "overfitting". Among the K features, a node using a best split point (e.g., based on minimizing some measure of misclassification error) may be established as a root node. In one arrangement, parameters such as Gini impurity or entropy may be used for computing misclassification errors resulting from selecting the features of a sample/sub-sample one by one, whereby a particular feature's split resulting in the least amount of misclassification error may be picked as a root node. Using the sub-populations of the branches from the root node, child nodes may be established for splitting the two sub-populations, again using a best split point criterion. The foregoing splitting/branching process may be repeated until a certain number of nodes (e.g., 8 to 16) have been reached resulting in a tree of certain depth (e.g., 3 to 4 levels). The overall process of generating a single decision tree may be repeated for a predetermined number of times, taking a different attribute variable as a starting root node, thereby resulting in an ensemble of trees (i.e., a Random Forest of trees), which forms a trained RF-based decision engine that may be used for predicting/estimating a target variable's value.

To illustrate the foregoing discussion with an example, consider the following 5-feature vector: [Age; Job; HowLongInCurrentJob; Income; Gender], with a training sample population of 1000 entities and the performance variable of whether a loan default was observed (e.g., Good: No Default; Bad: Default). By randomly selecting a feature among the five features and computing a best split at a threshold value, a root node may be established. For instance, let the root node be [Age] and the best split criterion be [Age<25]. The sample population of 1000 records may be observed as comprising a subset of 650 entities with no default (i.e., Good) and 350 entities with default (i.e., Bad), which may be split based on the root node criterion into two branches as shown in a resulting tree 400A of FIG. 4A, wherein reference numeral 404 refers to a first sub-population comprising 700 (as an example) and reference numeral 406 refers to a second sub-population comprising 300 (as an example). Under a non-replacement scenario, there are four additional attributes/features remaining, namely, [Job; HowLongInCurrentJob; Income; Gender]. By iterating the same procedure on both sub-populations, each with a randomly selected feature as the child nodal feature, each of the two sub-populations may be further split in a binary fashion resulting in a decision tree 400B of FIG. 4B. Here, the first sub-population of 700 (consisting 400 Good and 300 Bad records as per observation), is split on the basis of [CurrentJob] duration, with 5 years being the best split threshold (one that minimizes the Gini impurity), whereas the second sub-population of 300 (consisting 250 Good and 50 Bad records as per observation) is split on the basis of [Income] level, with $10,000 being the best split threshold that minimizes the Gini impurity. Accordingly, reference numerals 408 and 414 respectively refer to the two child nodes resulting from the root node, each of which is now shown as being split using the respective best split criterion as exemplified. Four grand child nodes are obtained as a result, with nodes 410 and 412 branching from node 408 and nodes 416 and 418 branching from node 414. Operating under the assumption of a 2-level tree depth requirement in this example scenario, the iterative process may be terminated such that the terminal nodes 410, 412, 416, 418 of the decision tree 400B may be referred to as "leaf" nodes.

In the foregoing process, it should be noted that not all of the attributes have been utilized in building the decision tree 400B. For example, the attribute [Gender] has not been used in building the tree. However, skilled artisans will recognize that typically there is no significant loss in the predictive behavior of the decision tree engine even where only a sub-sample of the feature set is utilized.

Once a decision tree such as the tree 400B has been built, scoring a new applicant or subject entity having a specific set of attribute values is relatively straightforward. Starting at the root node 402, the corresponding attribute value associated with the subject entity is compared and depending on the binary decision outcome, a branching path is taken to the next node below (i.e., a child node), where a similar decision is applied based on the attribute value applicable there. This decision taking process is repeated all the way down from the root node, ending at a particular leaf node, thereby resulting in a specific traversal of nodes for the subject entity. Because there is a sub-population count and a count of individual entities satisfying a performance variable (e.g., how many entities of the sub-population have defaulted) at each node, a probability may be determined at that node with respect to the performance variable (i.e., risk of default). For example, at node 408, the sub-population count is 700, with 300 entities having been observed as having defaulted. Probability of defaulting associated with that node 408 is therefore 300/700=0.428. Likewise, a nodal probability for default may be determined for each intermediate (or, interior) node and leaf node as follows: P (Node 414)=50/300=0.167; P (Node 410)=20/200=0.1; P (Node 412)=200/500=0.4; P (Node 416)=20/100=0.2; and P (Node 418)=50/200=0.25.

Figure 5:
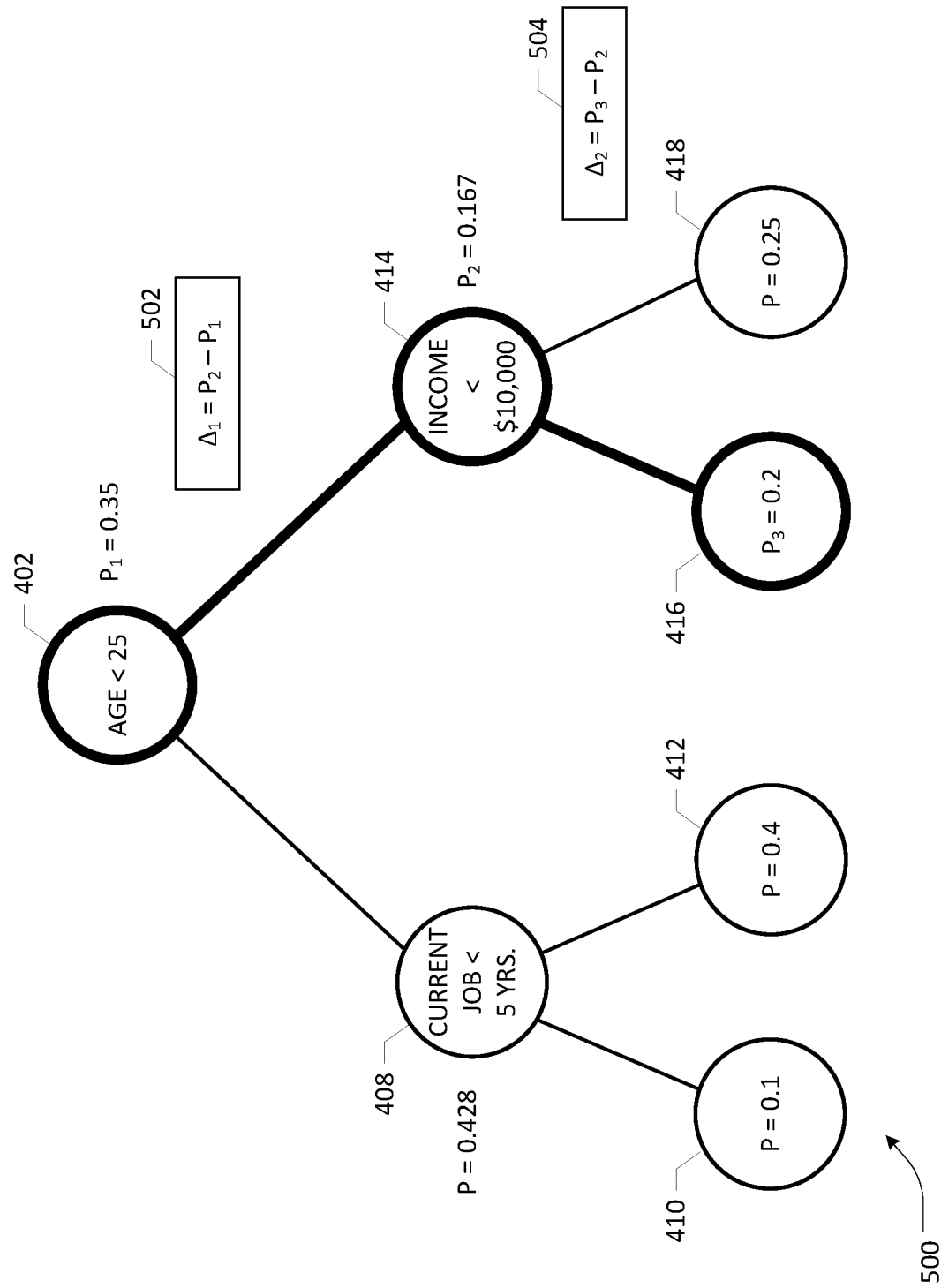
FIG. 5 depicts a single decision tree application for determining a probability value with respect to evaluating a decision criterion for a subject entity based on the RF decision tree of FIG. 4B.

Assuming that the subject entity's features satisfy the nodal decisions [Age<25] and [Income<$10,000] at nodes 402 and 414, respectively, the decision path terminates at the leaf node 416 where the probability of default is 0.2, as shown in an example default probability tree 500 of FIG. 5. Using this single tree for prediction, it can be seen that the decision path taken for the subject entity comprises nodes 402, 414, 416, which are shown in bold circles. For every segment or branch traversed between two nodes along the decision path, a differential probability may be computed as a "delta" between the two consecutive probabilities. Mathematically, this may be represented as follows:

$$\Delta_i = P_{(i+1)} - P_{(i)}$$

where $P_{(i+1)}$ is the probability associated with (i+1)th level node and $P_{(i)}$ is the probability associated with (i)th level node. It will be recognized by one skilled in the art that the differential probabilities indicate how much of an increase or decrease in the probability associated with a performance variable (e.g., default) has been obtained as an example decision path is traversed. In other words, a positive differential probability at node (i) is indicative of the gain in the probability of defaulting attributed to the feature associated with node (i). Likewise, a negative differential probability at node (i) is indicative of the reduction in the probability of defaulting attributed to the feature associated with node (i). It can therefore be seen that the probability associated with the leaf node 416 (i.e., P (Node 416)=20/100=0.2) is the result of the algebraic sum of the differential probabilities plus a bias term ($B_0$), which is the probability associated with the root node. Accordingly, the following relationship obtains: P (Node 416)=0.2=$\Delta_1$+$\Delta_2$+($B_0$), where $\Delta_1$=($P_2$−$P_1$)= 0.167−0.35 [=−0.183](as set forth at block 502); $\Delta_2$= ($P_3$−$P_2$)=0.2−0.167[=+0.033](as set forth at block 504); and ($B_0$)=0.35.

In one implementation, the probability of rejecting a subject entity's credit application may be linearly related to the probability of default obtained by applying a decision tree such as the one exemplified hereinabove. As a further generalization to a decision tree having a plurality of nodes along a decision path, the probability of default associated with a credit application of subject entity X may be computed as a decomposition of constituent components [$\Delta_i$] as follows:

$$P(X = \text{default}) = \sum_{Alongdecisionpath} [\Delta_i] + B_0$$

where each [$\Delta_i$] is a contribution associated with the attribute feature of the nodes along the decision path taken in a decision tree for a particular subject entity and $B_0$ is the root node bias factor. Again using a single decision tree, an adverse action may be generated as a subset of features that contribute the most to increase the probability of a credit applicant being/becoming default. Formally, this may be represented as follows:

$$AA(X) = \underset{TopR}{\text{Max}}\Delta_i, \ i \in \{PathOfDecision\}$$

where R is a configurable number of attribute features that contribute the most to the default probability of the credit application.

Skilled artisans will clearly recognize upon reference hereto that risk of default associated with a subject entity's credit application may be related to a probability associated with the subject entity's credit application being rejected. Accordingly, in some contexts, P(X=Default) and P(X=Rejected) may be treated somewhat analogously for purposes of an example illustration set forth in the present patent application.

Figure 6:
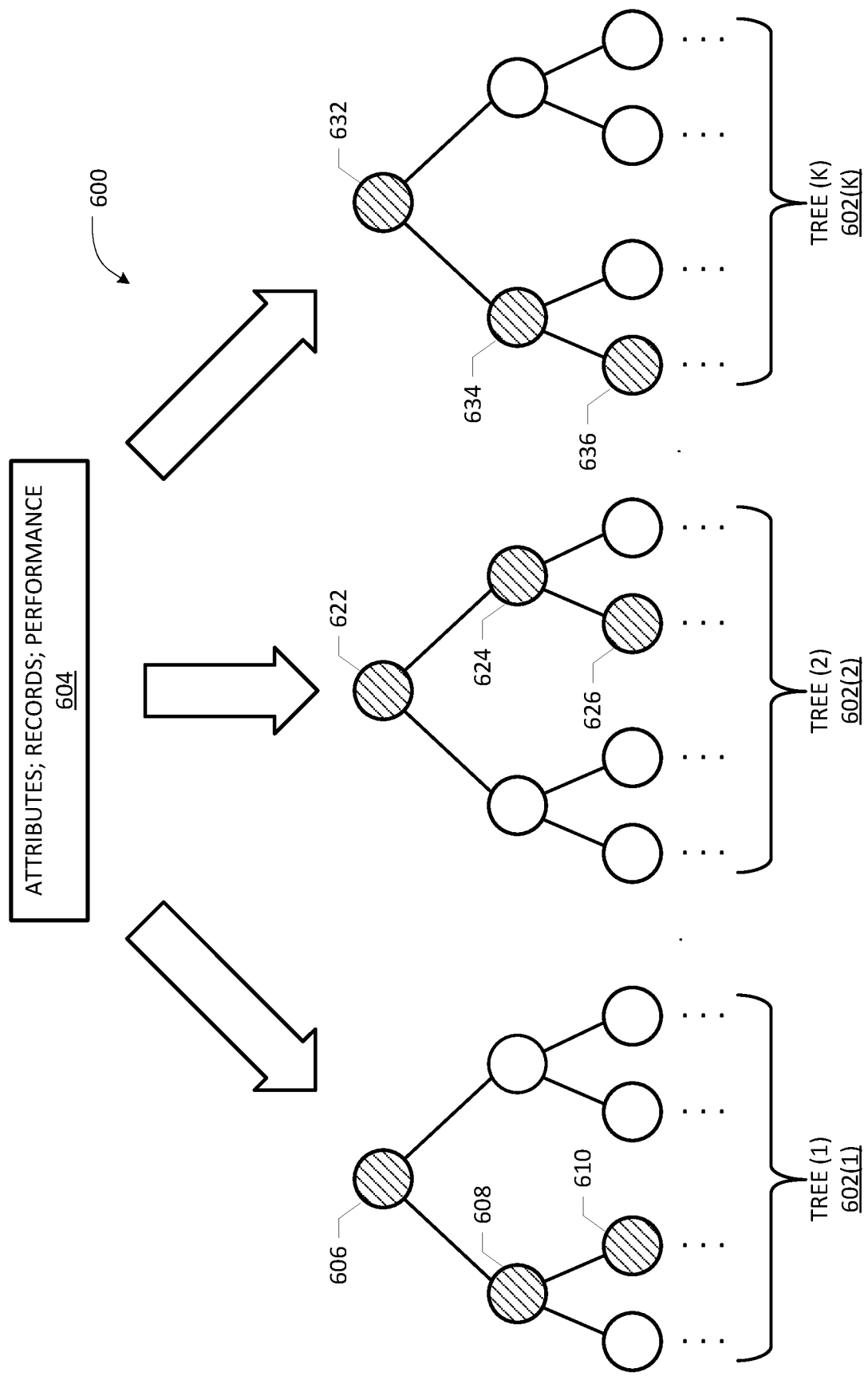
FIG. 6 depicts a generalized scheme for constructing an RF ensemble with a plurality of decision trees based on supervised learning applied to an example training database according to an embodiment of the present invention.

Whereas the foregoing analysis focuses on creating a single decision tree and utilizing that tree for prediction, the same analysis may be extended to an ensemble of trees, mutatis mutandis, with each tree giving rise to a P(X=Default) value, which may be averaged over the total number of trees in the RF ensemble. FIG. 6 depicts a generalized RF ensemble 600 operative as a trained/fitted decision engine comprising a plurality of decision trees 602(1) to 602(K) obtained responsive to performing a supervised learning technique using an example training database 604 according to an embodiment of the present invention. Although each tree 602(i) may comprise a decision tree determined in a manner similar to the methodology set forth above, an example embodiment of the RF ensemble 600 may comprise trees having different root nodes, different sizes (i.e., the number of levels in the tree), different best split criteria, etc. Each tree may therefore give rise to a unique decision path with respect to a particular subject entity. By way of illustration, nodes 606, 608, 610 may form a decision path for Tree 602(1); nodes 622, 624, 626 may form a decision path for Tree 602(2); and nodes 632, 634, 636 may form a decision path for Tree 602(K), with each decision path giving rise to a specific P(X=Default) value as a linear combination of the respective constituent components as described above. In one implementation, the overall probability value may be obtained as a simple statistical average of all probabilities respectively obtained from the trees. Skilled artisans will recognize that by forming a large number of trees and averaging over such a large ensemble, an embodiment of the present invention can advantageously increase robustness and reliability of prediction while still keeping the computational complexity and resource requirements (e.g., processing cycles, storage, etc.) to a minimum because of the lower computational order inherent in the creation of trained decision engines as set forth in the present patent application.

Consistent with the formal notation used above, the overall probability relating to a performance variable may therefore be stated as follows, where t is a tree index for all trees belonging to a given RF:

$$P(X = \text{Default})_{RFEnsemble} = 1/[\#\text{Trees}] \sum_{Tree \in RF} \sum_{Alongdecisionpath} \lfloor \Delta_i^t(X) + B^t \rfloor$$

The foregoing expression may also be written in a compact form as noted below, where $\lambda_F$ is final contribution from feature F (of a known feature space used in the RF ensemble) averaged over the entire the RF ensemble:

$$P(X = \text{Default})_{RFEnemble} = \sum_{Features, F} \lambda_F + B_{RF}$$

Based on the foregoing, an adverse action report or letter obtained over an ensemble of trees may be formalized as below:

$$AA^{RFEnsemble}(X) = \underset{TopR}{\text{Max}} \lambda_F$$

where AA are determined as the top R contributors associated with certain features across all the trees in an RF ensemble.

One skilled in the art will recognize that although an arithmetical mean averaging process over an ensemble is exemplified above, additional and/or alternative embodiments may include other techniques such as weighted averages, and the like.

It should be appreciated that in an embodiment of the present invention the probability function relating to a performance variable obtained over an ensemble of decision can be mathematically correlated to or otherwise mapped to a decision score or a credit score that can be easily interpreted, summarized, or described for purposes of a compliant action letter as well as for ease of communication and implementation. For example, a decision or credit score may be defined as a linear transformation of a log odds function or a natural log odds function that may be defined for a given probability. As such, the transformative relationship is arbitrary and does not affect the predictive power of a decision engine. Different credit scoring institutions may use different mathematical relationships to generate proprietary scorings specific to the institution. In one embodiment, therefore, a log odds function or log odds to the base e function (natural log odds or LnOdds) may be defined as follows:

Ln Odds[X]=Ln[P(X)/1−P(X)]

A decision score for subject entity X therefore may be defined as follows in a linear transformation:

Score[X]=α+β*Ln Odds(X)

where α and β may be determined by choosing (i) a specific score at a specific probability; and (ii) applying a known relationship such as Point-to-Double-the-Odds, e.g., the odds double every 20 points in the score.

Figure 7:
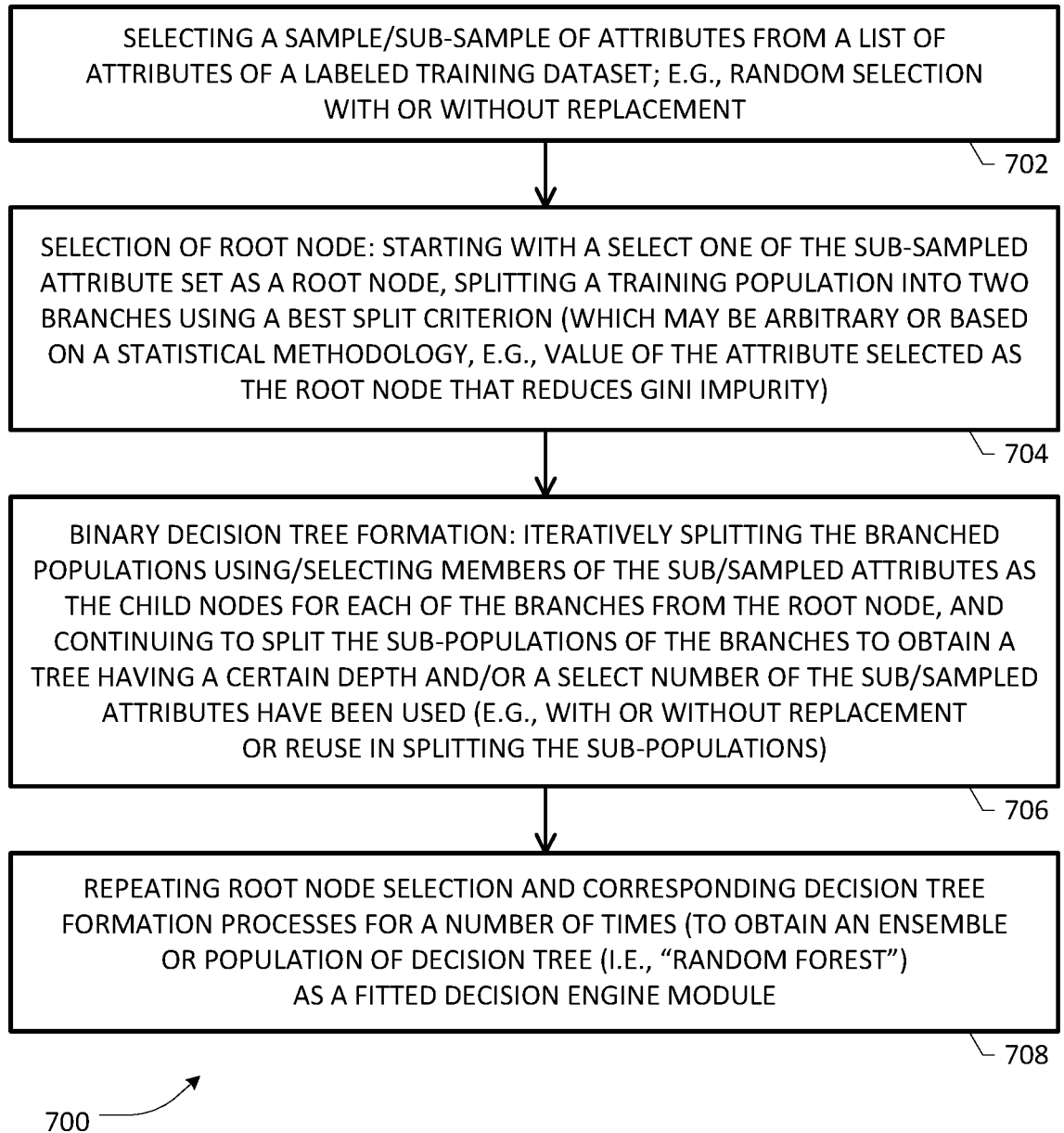
FIGS. 7 and 8 depict flowcharts of various blocks, steps and/or acts that may be combined with additional flowcharts for purposes of an example embodiment involving RF-based decision processing.
Figure 8:
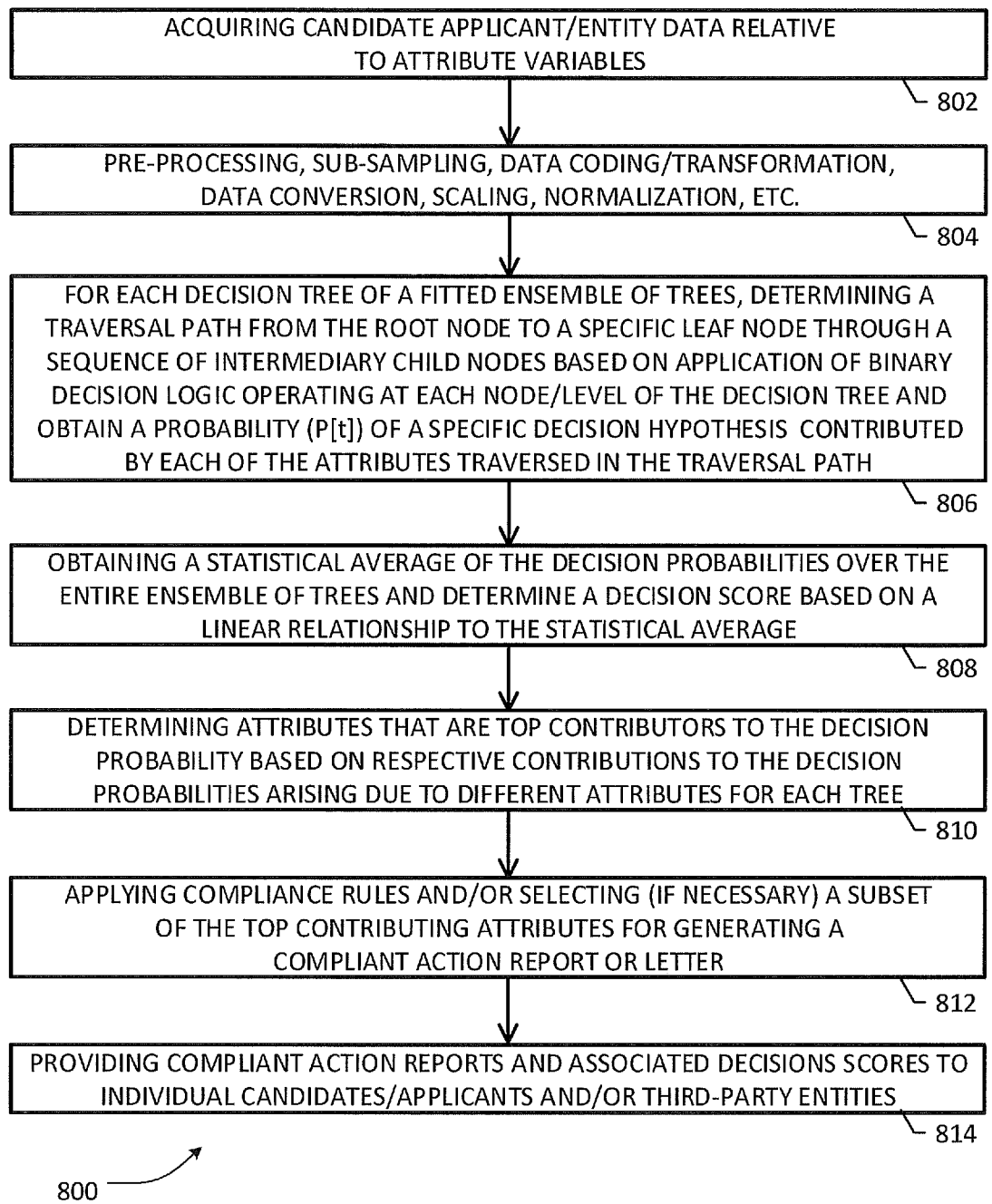

Turning to FIGS. 7 and 8, depicted therein are flowcharts of various blocks, steps and/or acts that may be combined with additional flowcharts for purposes of an example embodiment of the present patent disclosure involving RF-based decision processing. In particular, process 700 exemplified in FIG. 7 is illustrative of a supervised learning technique that may be applied to a labeled training sample for obtaining or generating an RF-based decision engine module. In one embodiment, a sample or sub-sample of attributes from a list of attributes or features of a labeled training dataset may be obtained (e.g., random selection with or without replacement), as set forth at block 702. A root node selection process set forth at block 704 may involve randomly selecting one of the sub/sampled attribute set as a root node, and splitting a training population into two branches using a best split criterion (which may be arbitrary or based on a statistical methodology, e.g., value of the attribute selected as the root node that reduces Gini impurity). A binary decision tree formation process set forth at block 706 may involve iteratively splitting the branched populations using/selecting members of the sub/sampled attributes as the child nodes for the each of the branches from the root node, and continuing to spit the sub-populations of the branches to obtain a tree having a certain depth and/or a select number of the sub/sampled attributes have been used (e.g., with or without replacement or reuse in splitting the sub-populations). At block 708, the root node selection and corresponding decision tree formation processes may be iteratively executed in a loop for a number of times (to obtain an ensemble or population of decision trees as a fitted RF decision engine module.

Process 800 illustrated in FIG. 8 is illustrative of a predictive decision making process with respect to a subject entity or candidate entity requiring a decision relative to a performance variable based on a set of predictor variables. At block 802, candidate applicant's data relative to a plurality of attribute variables may be obtained, received, or otherwise acquired as set forth above. In one example arrangement, one or more acts relating to pre-processing, sub-sampling, data coding/transformation, data conversion, scaling, normalization, etc. may be optionally executed, as set forth at block 804. For each decision tree of a fitted ensemble of trees (e.g., as part of an RF ensemble obtained in process 700 above), a decision traversal path may be determined from the root node to a specific leaf node of the tree through a sequence of intermediary child nodes based on the application of binary decision logic operating at each node/level of the decision tree (block 806). Responsive to the determination of a decision traversal path, a probability (P[t]) of a specific decision hypothesis contributed by each of the attributes traversed in the traversal path may be computed as described in detail hereinabove. At block 808, a statistical average of the decision probabilities over the entire ensemble of trees may be obtained. An overall decision score may be determined based on a linear relationship between the statistical average of the probability or log-odds thereof to the statistical average. At block 810, a determination may be made to determine attributes that are top contributors to the decision probability based on respective contributions to the decision probabilities arising due to different attributes for each tree. Because it is possible that each tree may have a different set of top contributors, suitable statistical/mathematical techniques may be applied to select an overall set of top contributors. At block 812, suitable compliance rules or regulations may be applied to the overall set of top contributors, wherein a subset of the top contributing attributes may be selected (if necessary) for generating a compliant action report or letter. For example, although a particular attribute variable may belong to a set of top contributors, it may not be selected for reporting if it belongs to a class of variables or characteristics deemed to evince bias, e.g., age, color, national origin, citizenship status, physical or mental disability, race, religion, creed, gender, sex, sexual orientation, gender identity and/or expression, genetic information, marital status, status with regard to public assistance, veteran status, or any other characteristic protected by federal, state or local law. At block 814, compliant action reports and associated decisions scores may be transmitted to individual candidates/applicants and/or third-party entities using suitable communication mechanisms as set forth previously. In another variation, a compliance filtering process may be employed before selecting a specific feature set such that there are no non-compliant features in the machine language-based decision-making process in the first place, whereby only approved features are made available for reporting in an action letter upon executing process 800. It should therefore be appreciated that depending on whether certain features are included at the outset or not, an example embodiment of the present invention may be advantageously configured to generate suitably compliant action letters in an efficient manner.

In a still further aspect of the present invention, a trained decision engine configured to effectuate a computer-implemented scheme for facilitating efficient decision-making with respect to a subject entity may comprise a GBT ensemble of regression trees. As noted previously, regression trees form another category of decision tree learning that proceeds from observations about an item (represented in branches) to conclusions about the item's target value (represented in the leaf nodes). Roughly similar to RF classification trees, a GBT regression tree ensemble may involve target performance variables that take categorical values about which a prediction or decision is required, although an individual GBT tree may use regression of a continuous variable. Broadly, gradient boosting is a machine learning technique for classification that involves building a decision engine in a step-by-step fashion, e.g., by using a forward stage-wise method, and allowing optimization of a suitable arbitrary differentiable loss function or cost function at each stage. In one implementation, successive regression trees in a GBT ensemble are fit on a negative gradient of a binomial deviance loss function so as to minimize the sum of residuals. It will be seen that once a GBT ensemble is constructed based on a labeled training dataset, the mechanism for predicting or decision making with respect to a subject entity is similar to that of an RF-based decision engine described in detail hereinabove.

Figure 9:
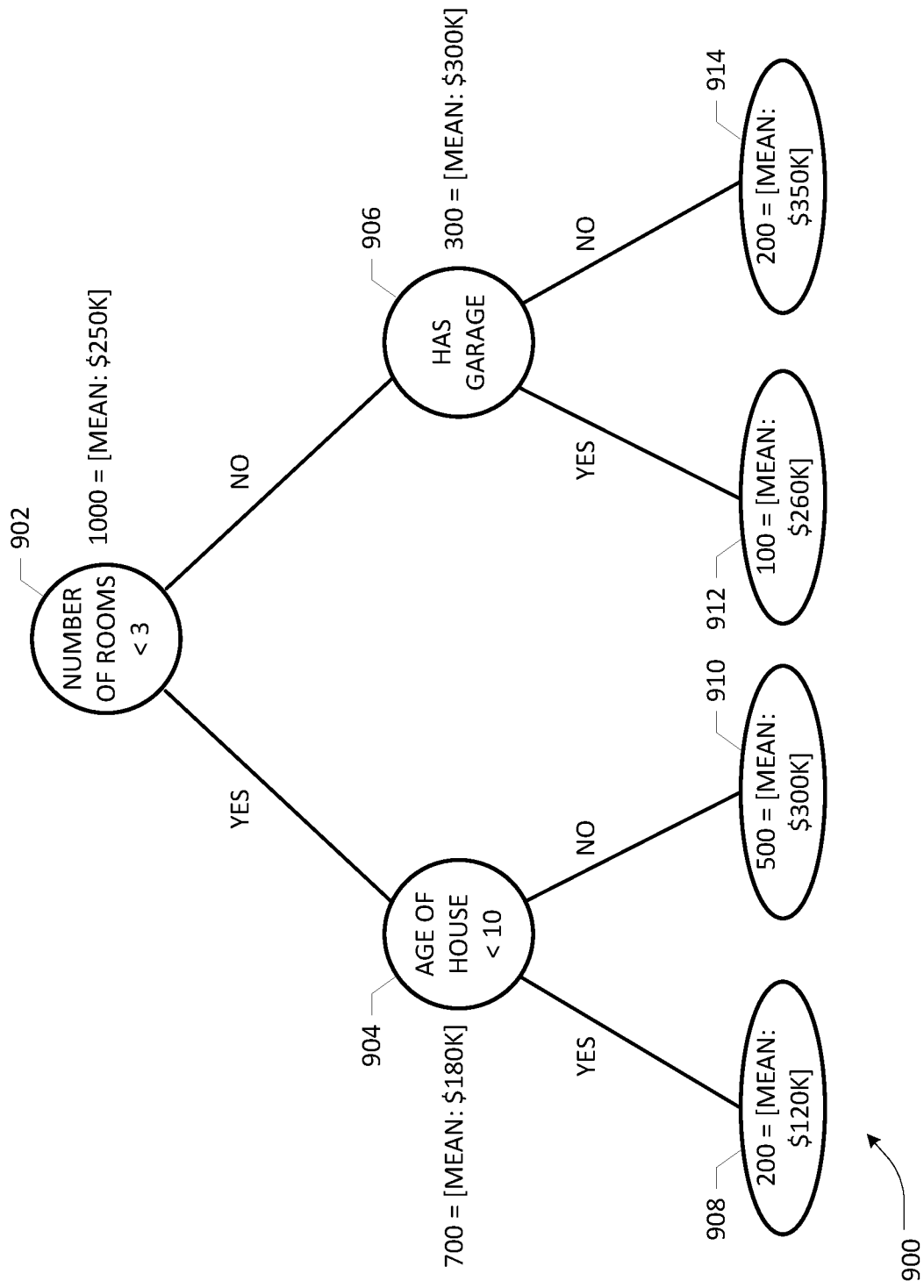
FIG. 9 depicts an illustrative example scheme for generating a regression decision tree purposes of an embodiment of the present invention.

For purposes of illustrating how a regression tree is built, attention is now turned to FIG. 9, wherein a simple example is set forth using a 5-dimensional feature vector for predicting a target/performance variable consisting the price of a house. Similar to the RF example set forth in FIGS. 4A-4B, a labeled training dataset including 1000 records is exemplified, wherein each record contains a description of a house in a 5-dimensional feature vector space based on the following attributes, e.g., [AgeOfHouse; NumberOfRooms; NumberOfBathrooms; HasGarage; HasGarden], and the price at which the house is sold. At step one, a best attribute or feature that minimizes a predetermined cost function is selected as a root node at which the sample population of 1000 is branched or split. For example, an arbitrary cost function may comprise a Mean Squared Error (MSE) although other similar cost functions may also be used. Where MSE is used, the technique involves determining the attribute that will minimize the distance between the prediction and the actual value if a split is done on it. Assuming that the mean price for the 1000 homes is $250,000 and the split is done on the attribute [NumberOfRooms<3], a root node 902 is established for a regression tree 900 as shown in FIG. 9. Instead of separating the sample population into two classes (e.g., satisfying a discrete performance variable as is the case in an RF decision tree), the cost function of MSE is minimized at each node. Accordingly, at each node, the predicted value is the mean of the target value of each sample or sub-population in the node, which is the price of the houses in the nodal set. Instead of a probability value, therefore, a mean value is associated with each node, which may be referred to as a "score" of the node. It should be noted that this score in the context of a regression tree (which may be referred to as a "regression score") is not the same as what is typically referred to as a credit score in financial lending, although it will be seen that a cumulative regression score over a GBT ensemble may be mapped or transformed to a credit score in a credit scoring application based on a GBT-based decision making process.

Applying the root node's best split criterion (i.e., one with the lowest MSE), a first branch for a first sub-population of 700 homes having rooms fewer than three and a second branch for a second sub-population of 300 homes having three or more rooms may be established. These sub-populations are further split based on applying the cost function minimization based on two of the remaining features that form child nodes, e.g., nodes 904, 906, respectively. As illustrated, the sub-population or sample (i.e., 700 homes) of node 904 having a mean score of $180,000 is split on the attribute [AgeOfHouse<10] and the sub-population or sample (i.e., 300 homes) of node 906 having a mean score of $300,000 is split on the attribute [HasGarage]. Accordingly, four grand child nodes are obtained as a result, with nodes 908 and 910 branching from node 904 and nodes 912 and 914 branching from node 906. Using a suitable criterion relating to the total number of terminal nodes, e.g., similar to the criteria used for RF trees described above, the iterative process may be terminated such that the terminal nodes 908, 910, 912, 914 of the regression tree 900 may operate as "leaf" nodes. Illustratively, leaf node 908 comprises a sample of 200 houses, with a mean score of $120,000; leaf node 910 comprises a sample of 500 houses, with a mean score of $300,000; leaf node 912 comprises a sample of 100 houses, with a mean score of $260,000; and leaf node 914 comprises a sample of 200 houses, with a mean score of $350,000.

It should be noted that similar to RF tree construction, not all of the attributes need to be used in building a regression tree. Also, both RF trees and GBT trees provide similar processes in terms of predicting a target variable for a new entity. For example, a new entity record goes through a root node of the regression tree and traverses a path down to a leaf node, whose score is the predicted value of the target variable (i.e., the mean value of the sample in that leaf node). However, construction of an ensemble of trees in the training stages of an RF-based decision engine and GBT-based decision engine are different. Whereas each decision tree in an RF ensemble is constructed independently (i.e., parallel prediction), the regression trees in the GBT ensemble are constructed sequentially, wherein each subsequent tree is chosen to minimize a loss function relative to its prior tree. In other words, the regression trees are sequentially linked such that a subsequent tree learns from the "mistakes" (i.e., error of misclassification) of its predecessor, wherein the information about misclassification is fed forward using a residual function in an example embodiment. Heuristically, this process may be described as follows by way of illustration. First, a decision tree may be fit on input data. Thereafter, a calculation of error residuals (i.e., differentials between the actual value and predicted target value) is made. A new regression tree is fit on the error residuals as a target variable with the same input variables (i.e., the feature vector) to obtain predicted error residuals. The predicted residuals are then added to the previous predicted target values. If there are error residuals still remaining, they are fit on a next regression tree. The foregoing steps may be iteratively repeated until there is overfitting and/or a convergence of the sum of residuals is attained. It should be appreciated that overfitting can be controlled by consistently checking accuracy on validation data.

Skilled artisans will recognize that a residual value associated with a regression tree is mathematically related to the score (i.e., predicted target value) obtained by traversing that regression tree. Accordingly, in mathematical equivalence, the score value of each regression tree is provided as input to the subsequent tree. The score value obtained from a regression tree is a continuous variable that can be converted to a probability range [0,1] using a suitable mapping such that it may be interpreted in a more conventional manner. For instance, a logit function may be used as follows for obtaining a probability value:

$$P_t\{X\}=L(X)=\text{Logit}(S_t)=1/[1+\exp(-X)]$$

The foregoing logit function may also be referred to as a loss function, which may be utilized in constructing an ensemble of sequentially trees. Once the first tree is constructed (e.g., similar to the illustrative example set forth hereinabove), each new tree is selected to minimize the loss function, given the current regression tree and its prediction of the target value. In formal notation, this is represented by the following equation:

$$GBT_{i+1} = GBT_i + \text{argmin}_h \sum_j L[y_j, GBT_i(x_j), h(x_j)]$$

where $y_j$ are the labels for $x_j$. This expression may be solved numerically using a "steepest descent" technique. Mathematically, the foregoing sequential linking of the trees leads to fitting the regression trees on the residuals of the previous trees (i.e., the difference between the predicted value and the target value). With respect to the first regression tree, it should be noted that there is no residue to fit, and accordingly, a suitable initialization data point may be assigned as a reference value from which residuals can be calculated. In one example implementation, a log odds value may be computed for each record as the initial probability from which the residual value may be computed.

Figure 10:
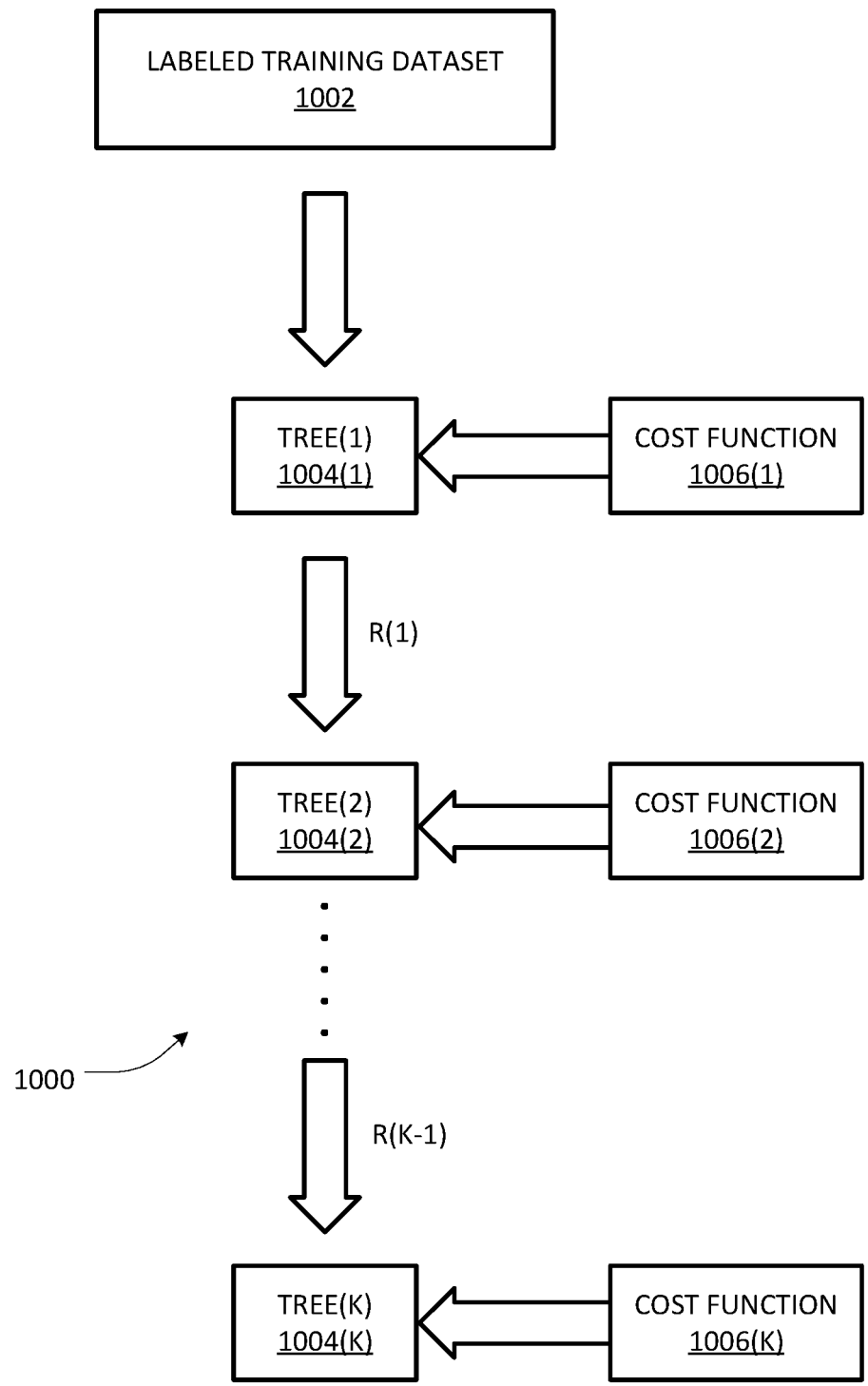
FIG. 10 depicts a generalized scheme for constructing a Gradient Boosted Tree (GBT) ensemble with a plurality of regression decision trees based on supervised learning applied to an example training database according to an embodiment of the present invention.

FIG. 10 depicts a schematic representation of a generalized GBT ensemble 1000 with a plurality of regression trees 1004(1) to 1000(K) based on supervised learning. An example training database 1002 containing a plurality of records may be provided as input to a training stage according to an embodiment of the present invention. Each tree resulting from the training stage is shown to be sequentially linked to a next tree by way of a residual input obtained from the tree in accordance with the teachings set forth hereinabove. Further, each tree may also be associated with a suitable cost function 1006(1) to 1006(K) for facilitating the construction of splits of a sample record population based on the attributes or predictors selected from the feature vector space.

As previously noted, predictions with respect to a new subject entity or candidate applicant using a given GB ensemble of trees may be made in a manner similar to the predictive process of an RF ensemble. The subject entity's attribute values are passed through each regression tree, starting at the root node and terminating at a leaf node having a score, $S_t$. Once the scores are obtained from all the trees (K), they are summed to obtain a total score:

$$S_{GBT}(X) = \sum_{t=1}^{K} S_t(X)$$

As noted previously, this total score may be mapped to a probability value based on a logit function although other mathematical relationships may be also used for such mapping. Accordingly, in one example implementation, the probability value relative to a performance variable (i.e., defaulting on a loan) as a function of $S_{GBT}$ may be determined as follows:

$$P(X=\text{Default})=\text{Logit}(S_{GBT})=1/[1+\exp(-S_{GBT})]$$

Furthermore, this probability may be converted to a credit or decision score using a linear mapping and appropriate scaling as set forth above in the case of RF-based decision making. Moreover, in a similar fashion, $S_{GBT}$ may be decomposed into a linear combination of the differences between the nodes of the respective trees, as shown below:

$$S_{GBT}(X) = [1/\#ofTrees] * \left[\sum_t B_0^t + \sum_{Nodes} \Delta_i^t(X)\right]$$

Since $S_{GBT}$ is related to the probability (hence to a credit decision score), the linearly decomposed constituent differential components of the score may be advantageously correlated to determine which attributes contribute the most to a credit decision score. It should be noted that the logit function is a strictly monotonic function in that if any Δ increases, the $S_{GBT}$ value also increases. Accordingly, suitable action letters or reports that are compliant may be generated and transmitted similar to the processes set forth hereinabove.

Figure 11:
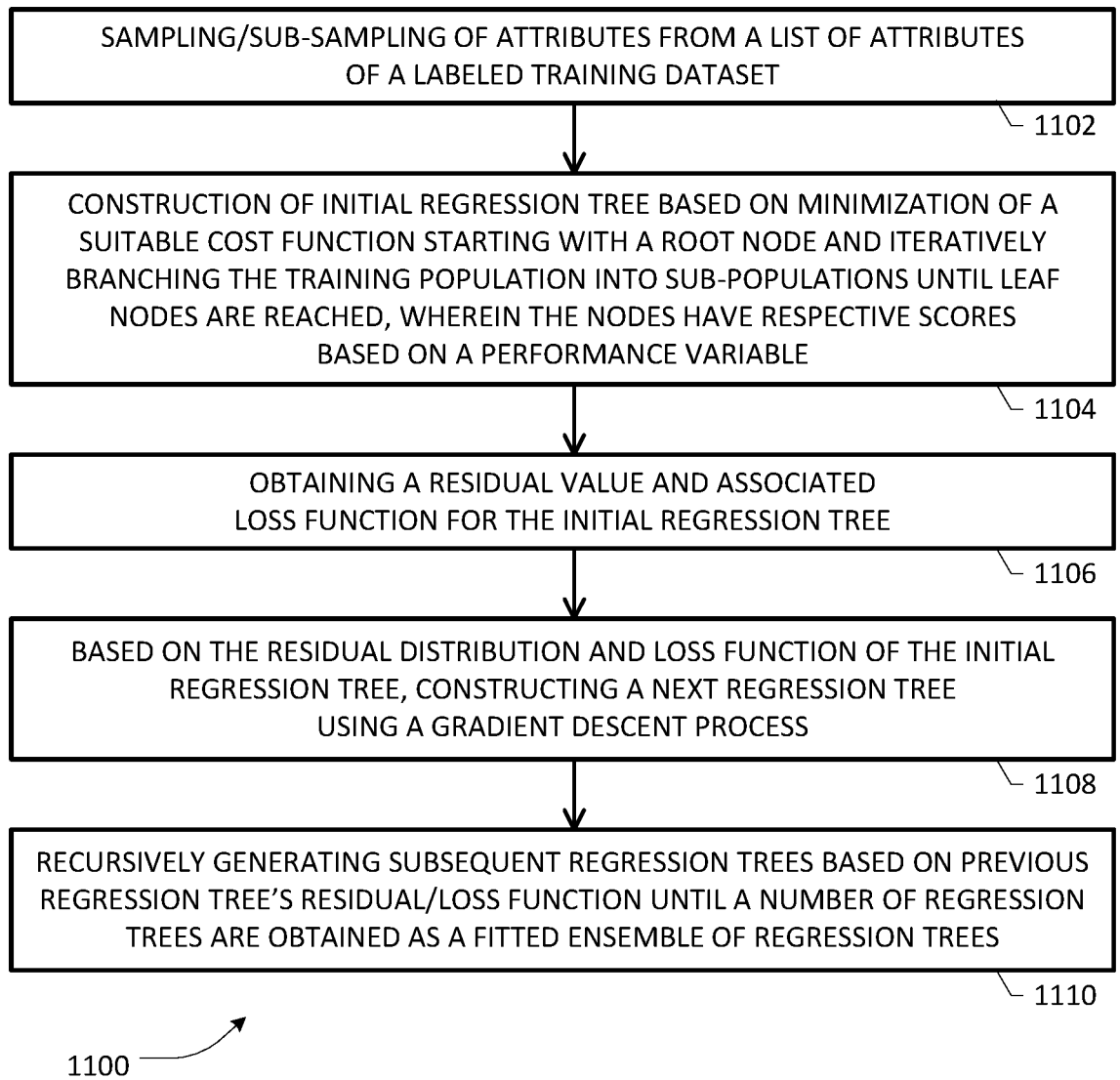
FIGS. 11 and 12 depict flowcharts of various blocks, steps and/or acts that may be combined with additional flowcharts for purposes of an example embodiment involving GBT-based decision processing.
Figure 12:
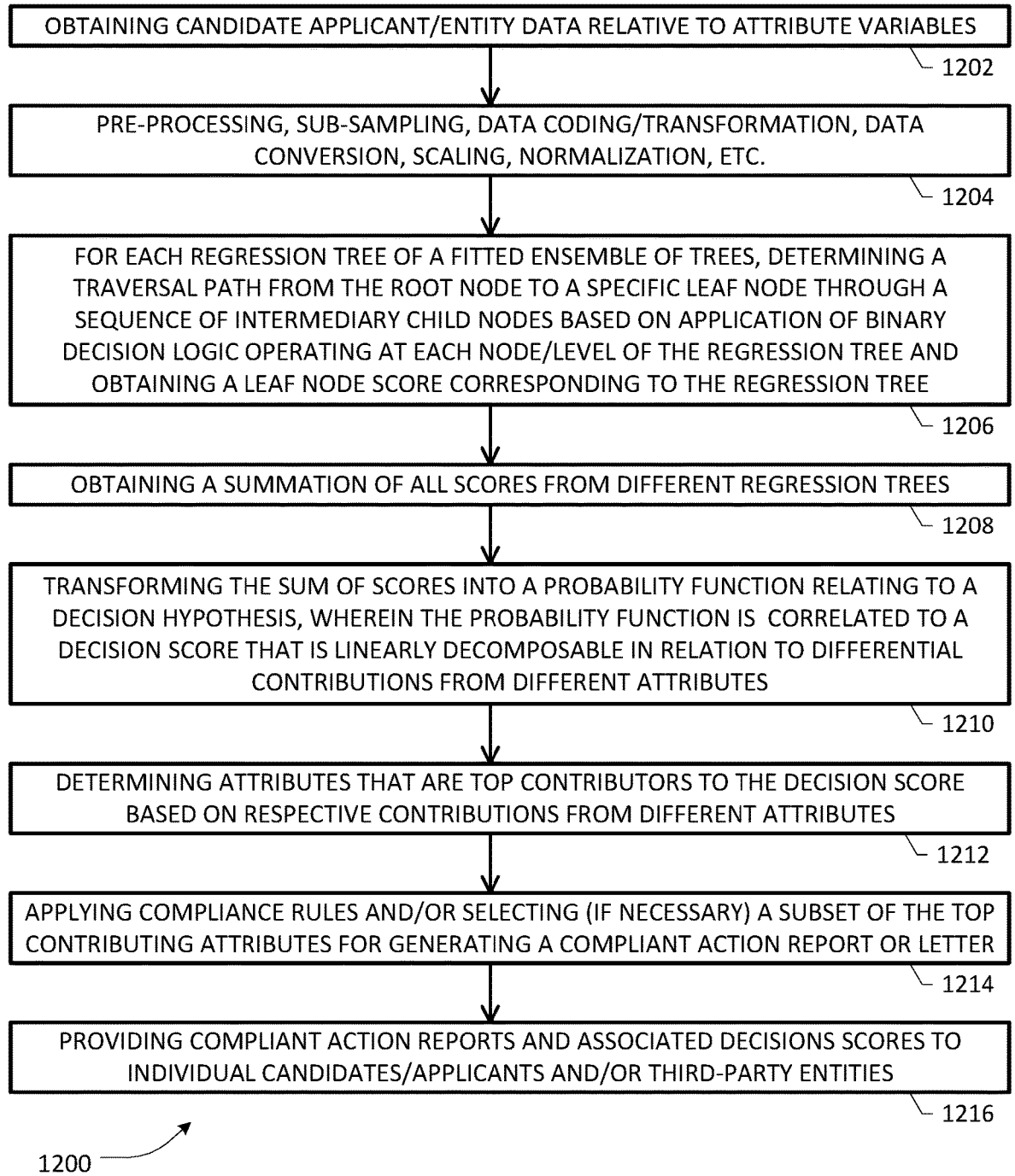

FIGS. 11 and 12 depict flowcharts of various blocks, steps and/or acts that may be combined with additional flowcharts for purposes of an example embodiment of the present patent disclosure involving GBT-based decision processing. In particular, process 1100 exemplified in FIG. 11 is illustrative of a supervised learning technique that may be applied to a labeled training sample for obtaining or generating a GBT-based decision engine module. In one embodiment, at block 1102, a sample or a sub-sample of attributes may be obtained from a list of attributes similar to the process 700 shown in FIG. 7. At block 1104, a first regression tree may be constructed based on minimization of a suitable cost function, starting with a root node and iteratively branching the training population into sub-populations until leaf nodes are reached. As noted previously, each of the nodes have respective scores based on a performance variable for which a prediction is desired. At block 1106, a residual value and/or associated loss function for the initial regression tree is obtained. Based on the residual value and/or loss function of the initial regression tree, a next regression tree may be constructed using a gradient descent process (block 1108). At block 1110, subsequent regression trees may be generated recursively/iteratively based on previous regression tree's residual/loss function until a number of regression trees are obtained as a fitted ensemble of regression trees.

Process 1200 depicted in FIG. 12 is illustrative of a predictive process with respect to a subject entity or candidate entity requiring a decision relative to a performance variable based on a set of predictor variables using a trained GBT ensemble. At block 1202, candidate applicant's data relative to a plurality of attribute variables may be obtained, received, or otherwise acquired using a number of mechanisms and in various contexts as set forth previously. Similar to the case of RF-based predictive decision-making, one or more acts relating to pre-processing, sub-sampling, data coding/transformation, data conversion, scaling, normalization, etc. may be optionally executed, as set forth at block 1204. For each regression tree of a fitted ensemble of trees (e.g., as part of a GBT ensemble obtained in process 1100 above), a decision traversal path may be determined from the root node to a specific leaf node through a sequence of intermediary child nodes based on application of binary decision logic operating at each node/level of the regression tree, whereby a leaf node score corresponding to the regression tree is obtained (block 1206). At block 1208, scores from all regression trees are added, which are then transformed into a probability function relating to a decision hypothesis. As noted previously, the sum of scores is linearly decomposable in relation to the contributions from different attributes (block 1210). Further, the probability function may be correlated or mapped to a decision score, e.g., a credit score. A determination may be made to identify the attributes that are top contributors to the decision score based on respective contributions from different attributes (block 1212). At blocks 1214 and 1216, various acts, steps, and functionalities relating to generating and providing compliant action letters are set forth for purposes of an example embodiment of the present invention, similar to blocks 812 and 814 described hereinabove.

Figure 13:
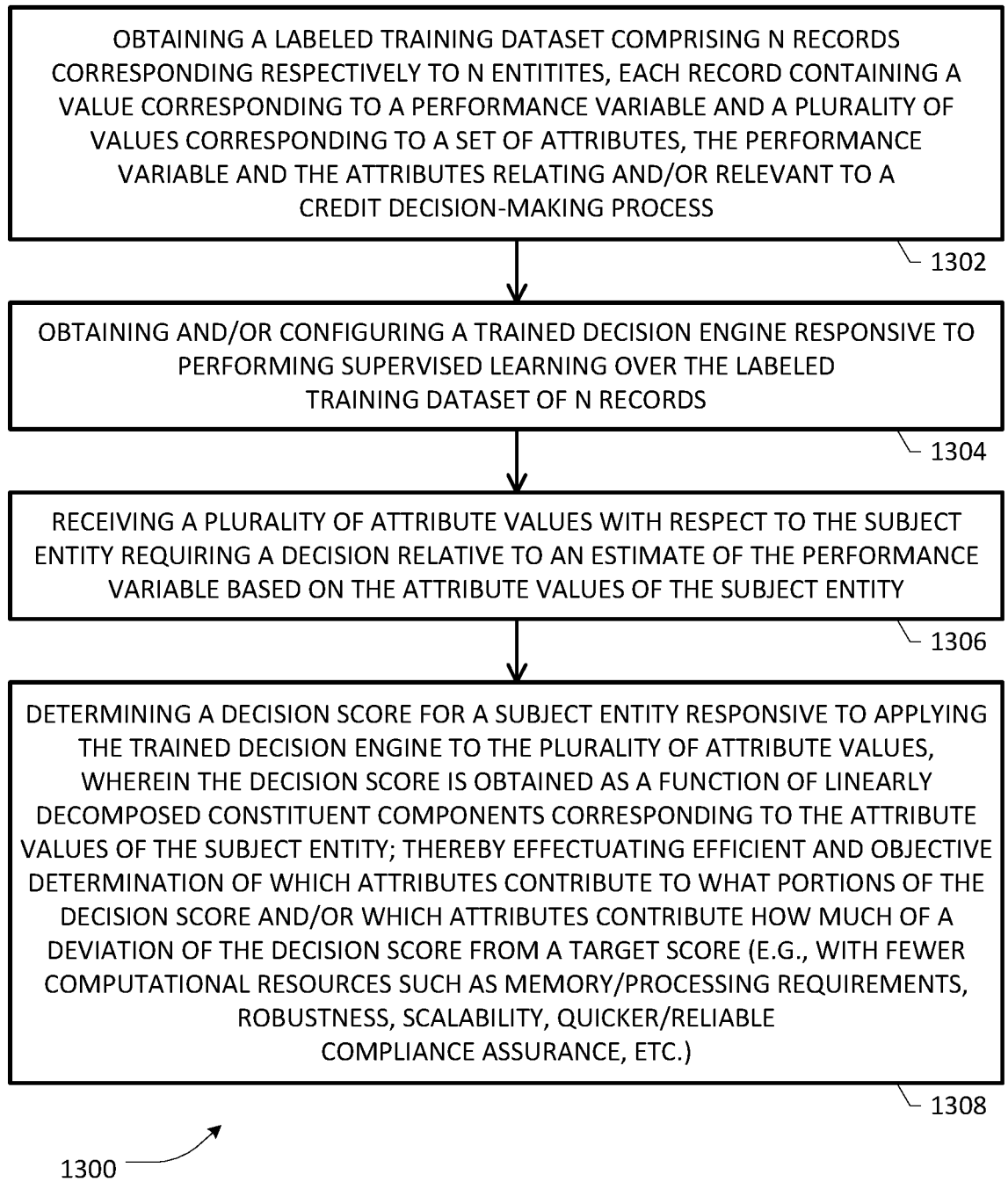
FIG. 13 is a flowchart of various blocks, steps and/or acts that may be combined with additional flowcharts for purposes of an example embodiment of the present patent disclosure.

FIG. 13 is a flowchart of various blocks, steps and/or acts that may be combined with additional flowcharts for purposes of an example embodiment of the present patent disclosure. In particular, process 1300 is illustrative of a computer-implemented scheme for facilitating efficient decision-making with respect to a performance variable of interest for a subject entity depending on the specific implementation. At block 1300, a labeled training dataset comprising N records corresponding respectively to N entities may be obtained, wherein each record contains a value corresponding to the performance variable and a plurality of values corresponding to a set of attributes, the performance variable and the attributes relating and/or relevant to a credit decision-making process. At block 1304, a trained decision engine may be obtained, determined, and/or configured responsive to performing supervised learning over the labeled training dataset of N records. At block 1306, a plurality of attribute values are received or obtained with respect to the subject entity requiring a decision relative to an estimate of the performance variable based on the attribute values of the subject entity. At block 1308, a decision score for the subject entity may be determined responsive to applying the trained decision engine to the plurality of attribute values to determine the decision score, wherein the decision score is related to a probability function or a sum of scores, obtained as a linearly decomposed constituent components (e.g., constituent probabilities in an RF ensemble engine or constituent differential scores in a GBT ensemble engine) that correspond to the attribute values of the subject entity. Accordingly, an efficient and objective determination may therefore be effectuated with respect to which attributes contribute to what portions of the decision score and/or which attributes contribute how much of a deviation of the decision score from a target score (e.g., with fewer computational resources such as memory/processing requirements, faster convergence times, robustness, scalability, quicker/reliable compliance assurance, etc.).

Figure 14:
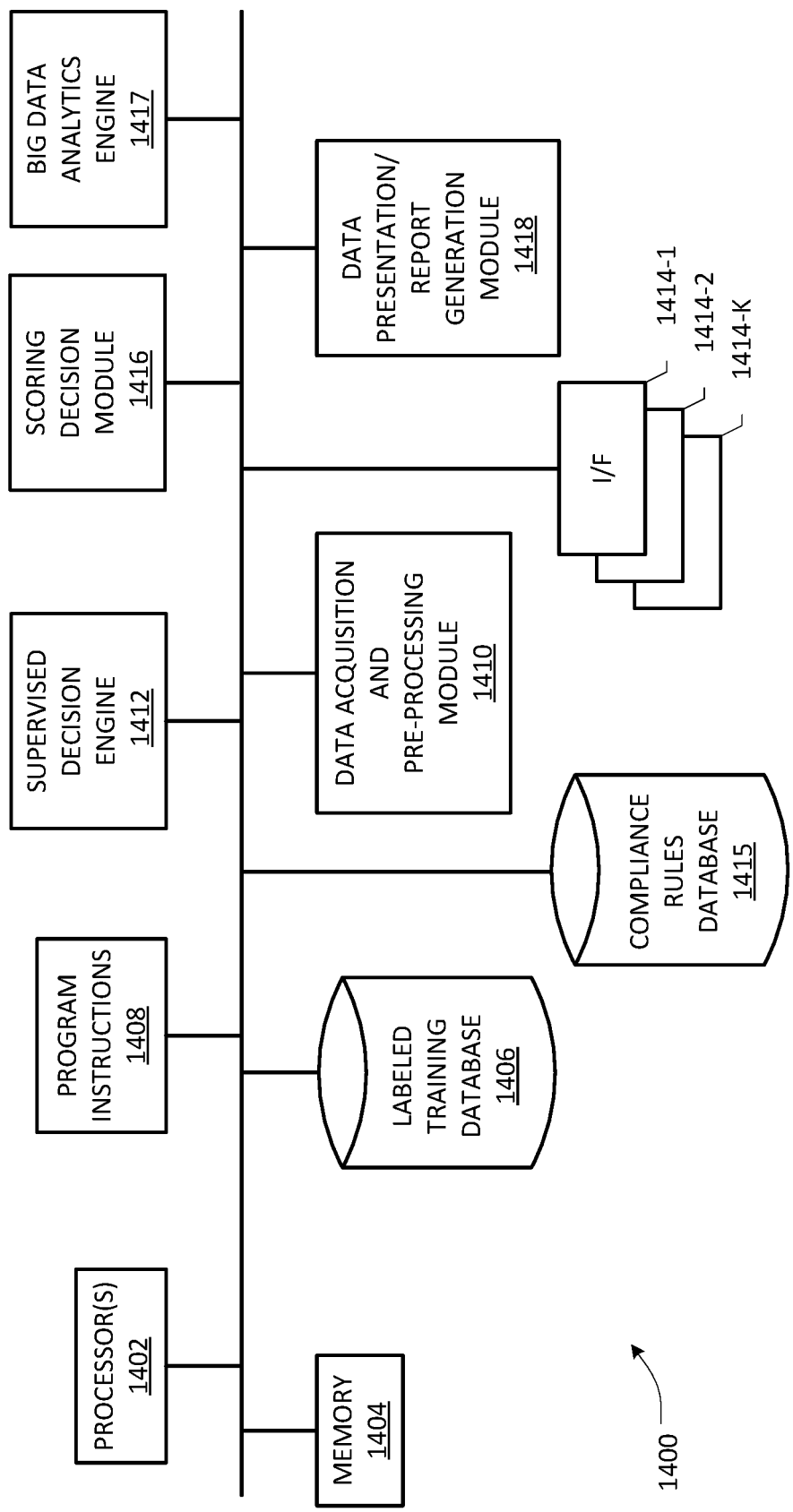
FIG. 14 depicts a block diagram of a network node or platform adapted to effectuate a decision making process based on supervised learning according to an embodiment of the present patent application.

FIG. 14 depicts a block diagram of a network node or platform 1400 adapted to effectuate a decision making process based on supervised learning according to an embodiment of the present patent application. It will be appreciated that platform 1400 may be realized as a computer-implemented apparatus that may be (re)configured and/or (re)arranged as a distributed computing system, node or element at a hosted service provider network location, financial institution, credit reporting bureau, and/or a cloud-based datacenter location according to an embodiment of the present patent disclosure. Skilled artisans will therefore recognize that platform 1400 and/or its constituent components may be suitably configured to execute any of the processes, methods, and/or schemes set forth herein in a co-located, integrated or distributed architecture. Accordingly, one or more processors 1402 may be operatively coupled via local communication paths or remote communication paths to various modules that may be implemented in persistent memory e.g., memory 1404, 1408, for executing suitable program instructions or code portions with respect to one or more processes set forth in the present patent application in order to facilitate computationally efficient decision-making processes using supervised learning. A supervised decision engine 1412 may be configured to interoperate with a labeled training database 1406 and a scoring determination/decision module 1416 for performing RF-based or GBT-based decision processing in accordance with an embodiment of the present invention. A data presentation and report generation module 1418 is operative with a compliance rules database 1415 and scoring decision/determination module 1416 for generating and providing compliant action letters for subject entities and/or other parties. In some embodiments, a Big Data analytics module 1417 may be configured to facilitate various data processing operations with respect to obtaining training/validation data, attributes data, third-party credit bureau data, demographic/marketing data, financial history data, etc. as discussed above. In one embodiment, Big Data analytics platform 1417 may be implemented as a programming model framework for processing and generating large data sets with a parallel, distributed algorithmic engine that may be executed in a "massively parallel processing" (MPP) architecture with software running on a large number of servers (e.g., a server farm). For example, a MapReduce programming platform may be configured as an implementation of the analytics service platform, either as part of apparatus 1400 or separately associated therewith for analyzing and correlating the attribute variable data, etc. Depending on the configuration, various network interfaces (I/F) 1414-1 to 1414-K may be appropriately provided with respect to effectuating communications with, inter alia, subject entities, financial institutions, third-party credit bureaus, governmental agencies, and the like.

Based upon the foregoing Detailed Description, one skilled in the art will recognize that embodiments of the present invention provide superior credit decisioning techniques that are computationally more effective compared to existing statistical modelling approaches. In general, embodiments set forth herein are configured to execute on the order of quadratic time, i.e., $O\{N^2\}$, even where tens of thousands of trees are employed in an example decision engine according to the teachings of the present disclosure. Furthermore, because the probabilities and/or decision scores resulting from a decision making process can be uniquely and linearly decomposed to a set of components that correspond to a subject entity's attributes, compliant action letters can be easily generated and transmitted as needed.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein. Further, some terms may comprise trademarked terms regardless of whether such terms have explicitly been so identified and any proprietary rights therein may belong to the respective owners thereof.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Other blocks may also be added/inserted between the blocks that are illustrated. Whereas some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A computer-implemented method, comprising:
   training a decision engine based on a labeled training dataset to generate a trained decision engine, the labeled training dataset containing N records corresponding to N entities respectively, each record comprising a value relating to a performance variable and a plurality of values corresponding to a set of attribute variables, wherein the trained decision engine comprises a Gradient Boosted Tree (GBT) ensemble of a plurality of regression trees and the training comprises:
      constructing an initial regression tree based on minimization of a cost function associated with a root node corresponding to a select attribute variable and iteratively branching a training population into subpopulations corresponding to a set of leaf nodes based on remaining attribute variables;
      determining a residual value and a corresponding loss function associated with the initial regression tree;
      constructing a next regression tree based on the residual value and the loss function of the initial regression tree; and
      iteratively generating subsequent regression trees based on a predecessor regression tree's residual value and corresponding loss function associated therewith, the iterative generation continuing until a predetermined number of regression trees are obtained as a fitted ensemble of the plurality of regression trees operable as the trained decision engine;
   receiving, over a communications network, input values corresponding to a plurality of attributes associated with a subject entity, the input values acquired from a user equipment (UE) device operated by the subject entity;
   determining, by the trained decision engine, a decision score for the subject entity responsive to the input values;

decomposing the decision score into a set of linearly decomposed constituent components corresponding to the attributes of the subject entity;

uniquely identifying respective portions of the decision score contributed by the corresponding attributes of the subject entity; and generating an action report with respect to the decision score using only a selected subset of the linearly decomposed constituent components, the selected subset of the linearly decomposed constituent components objectively determined based on respective contributions to the decision score.

2. The computer-implemented method as recited in claim 1, further comprising generating the action report regardless of an adverse decision based on the decision score.

3. The computer-implemented method as recited in claim 1, wherein the selected subset of the linearly decomposed constituent components are determined based on the attributes that contribute most to the decision score.

4. The computer-implemented method as recited in claim 1, further comprising determining that the attributes of the subject entity corresponding to the selected subset of the linearly decomposed constituent components are compliant with respect to a set of regulatory compliance rules.

5. The computer-implemented method as recited in claim 1, further comprising transmitting the action report to at least one of the subject entity, a governmental agency, a financial institution, and a third-party entity.

6. The computer-implemented method as recited in claim 1, wherein the next regression tree and the subsequent regression trees are generated using a gradient descent process.

7. The computer-implemented method as recited in claim 1, further comprising:

selecting a subset of attribute variables; and constructing the next regression tree and the subsequent regression trees using only the selected subset of attribute variables.

8. The computer-implemented method as recited in claim 7, wherein the subset of attribute variables are randomly selected from the set of attribute variables.

9. The computer-implemented method as recited in claim 1, wherein the set of attribute variables comprise one or more socio-economic variables, demographic variables, medical history variables, financial history variables, and variables based on social media network profiles for the N entities.

10. The computer-implemented method as recited in claim 1, further comprising storing only the selected subset of the linearly decomposed constituent components.

11. An apparatus, comprising:

one or more processors;

one or more persistent memory modules coupled to the one or more processors, the one or more persistent memory modules having program instructions stored thereon which, when executed by the one or more processors, are configured to perform following acts:

training a decision engine based on a labeled training dataset to generate a trained decision engine, the labeled training dataset containing N records corresponding to N entities respectively, each record comprising a value relating to a performance variable and a plurality of values corresponding to a set of attribute variables, wherein the trained decision engine comprises a Gradient Boosted Tree (GBT) ensemble of a plurality of regression trees and the training comprises:

constructing an initial regression tree based on minimization of a cost function associated with a root node corresponding to a select attribute variable and iteratively branching a training population into sub-populations corresponding to a set of leaf nodes based on remaining attribute variables;

determining a residual value and a corresponding loss function associated with the initial regression tree;

constructing a next regression tree based on the residual value and the loss function of the initial regression tree; and iteratively generating subsequent regression trees based on a predecessor regression tree's residual value and corresponding loss function associated therewith, the iterative generation continuing until a predetermined number of regression trees are obtained as a fitted ensemble of the plurality of regression trees operable as the trained decision engine;

receiving, over a communications network, input values corresponding to a plurality of attributes associated with a subject entity, the input values acquired from a user equipment (UE) device operated by the subject entity;

determining, by the trained decision engine, a decision score for the subject entity responsive to the input values;

decomposing the decision score into a set of linearly decomposed constituent components corresponding to the attributes of the subject entity; and uniquely identifying respective portions of the decision score contributed by the corresponding attributes of the subject entity; and a report generator configured to generate an action report with respect to the decision score using only a selected subset of the linearly decomposed constituent components, the selected subset of the linearly decomposed constituent components objectively determined based on respective contributions to the decision score.

12. The apparatus as recited in claim 11, wherein the report generator is configured to generate the action report regardless of an adverse decision based on the decision score.

13. The apparatus as recited in claim 11, wherein the selected subset of the linearly decomposed constituent components are determined based on the attributes that contribute most to the decision score.

14. The apparatus as recited in claim 11, wherein the program instructions include instructions for determining that the attributes of the subject entity corresponding to the selected subset of the linearly decomposed constituent components are compliant with respect to a set of regulatory compliance rules.

15. The apparatus as recited in claim 11, wherein the program instructions include instructions for transmitting the action report to at least one of the subject entity, a governmental agency, a financial institution, and a third-party entity.

16. The apparatus as recited in claim 11, wherein the program instructions further comprise instructions for generating the next regression tree and the subsequent regression trees using a gradient descent process.

17. The apparatus as recited in claim 11, wherein the program instructions further comprise instructions for:
   selecting a subset of attribute variables; and
   constructing the next regression tree and the subsequent regression trees using only the selected subset of attribute variables.

18. The apparatus as recited in claim 17, wherein the subset of attribute variables are randomly selected from the set of attribute variables.

19. The apparatus as recited in claim 11, wherein the set of attribute variables comprise one or more socio-economic variables, demographic variables, medical history variables, financial history variables, and variables based on social media network profiles for the N entities.

20. The apparatus as recited in claim 11, further comprising a storage unit configured to store only the selected subset of the linearly decomposed constituent components.

\* \* \* \* \*